(12) United States Patent
Kumano et al.

(10) Patent No.: US 6,502,132 B1
(45) Date of Patent: Dec. 31, 2002

(54) NETWORK MONITORING SYSTEM, MONITORING DEVICE, AND MONITORED DEVICE

(75) Inventors: Satoshi Kumano, Kawasaki (JP); Takashi Fukagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/257,789

(22) Filed: Feb. 25, 1999

(30) Foreign Application Priority Data

Jun. 30, 1998 (JP) .......................................... 10-183781

(51) Int. Cl.[7] .......................................... G06F 15/173
(52) U.S. Cl. ...................................................... 709/224
(58) Field of Search .................................. 709/223, 224, 709/230; 714/6; 340/825.52, 825.2; 370/401

(56) References Cited

U.S. PATENT DOCUMENTS

| | | | | |
|---|---|---|---|---|
| 5,390,173 A | * | 2/1995 | Spinney et al. | 370/401 |
| 5,471,618 A | * | 11/1995 | Isfeld | 340/825.52 |
| 5,706,210 A | * | 1/1998 | Kumano et al. | 709/224 |
| 5,734,642 A | * | 3/1998 | Vaishnavi et al. | 340/825.2 |
| 5,790,797 A | * | 8/1998 | Shimada et al. | 709/224 |
| 5,796,633 A | * | 8/1998 | Burgess et al. | 709/224 |
| 5,901,280 A | * | 5/1999 | Mizuno et al. | 714/6 |
| 5,964,837 A | * | 10/1999 | Chao et al. | 709/224 |
| 6,052,722 A | * | 4/2000 | Taghadoss | 709/224 |

FOREIGN PATENT DOCUMENTS

GB  2 286 317 A  *  8/1995

* cited by examiner

Primary Examiner—Patrice Winder
(74) Attorney, Agent, or Firm—Katten, Muchin, Zavis, Rosenman

(57) ABSTRACT

A network monitoring system includes a network, a monitoring device connected to the network, and a plurality of monitored devices connected to the network, each of the monitored devices having various statuses thereof summarized as a summary status, and sending the summary status to the monitoring device when sending a response in reply to a summary-status collecting command issued from the monitoring device as well as when sending other information that is not the response, wherein the monitoring device controls the summary status of a given one of the monitored devices based on the summary status received from the given one of the monitored devices.

17 Claims, 43 Drawing Sheets

FIG.14A

· SUMMARY STATUS OF ENTIRE NETWORK

| DEVICE | TRANSMIS-SION LINE | PATH | SWITCHING | TESTING |
|---|---|---|---|---|
| (RED) | (RED) | (GREEN) | (RED) | (VIOLET) |

FIG.14B

· LIST OF STATUS SUMMARIES

| LIST OF STATUS SUMMARIES | | | | | |
|---|---|---|---|---|---|
| DEVICE ADDRESS | DEVICE | TRANSMISSION LINE | PATH | SWITCHING | TESTING |
| DEVICE #1 | NORMAL | ABNORMAL | NORMAL | ABSENT | ABSENT |
| DEVICE #2 | NORMAL | ABNORMAL | NORMAL | ABSENT | ABSENT |
| DEVICE #3 | ABNORMAL | NORMAL | NORMAL | PRESENT | PRESENT |

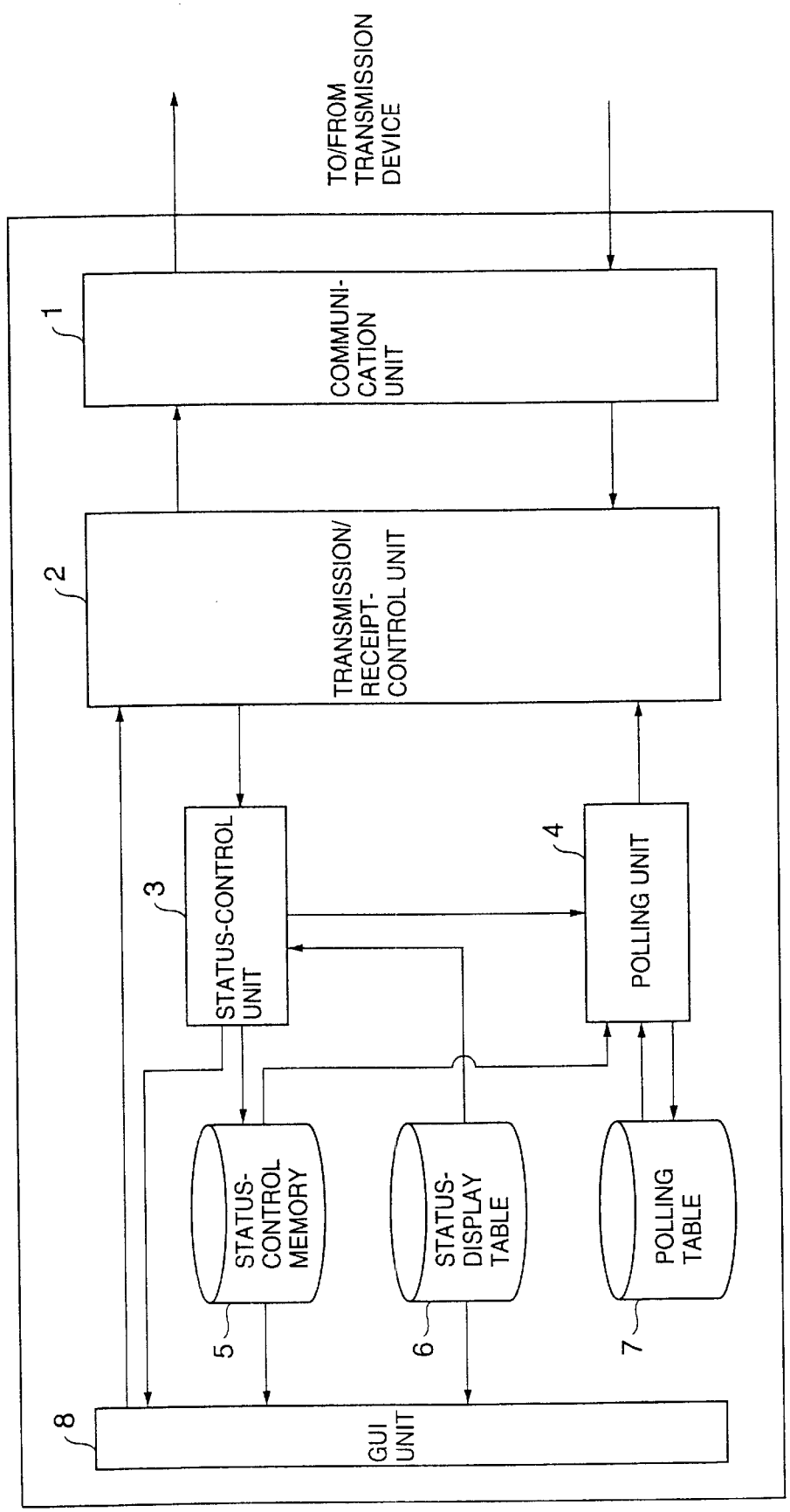

FIG.18

[1] ←------------------ POSITION OF SUMMARY STATUS BIT
TITLE=DEVICE ←--------- NAME OF STATUS
SUM=OR ←--------------- SUMMARIZING METHOD
0=NORMAL,0,255,0
1=ABNORMAL,255,0,0 ←--- DISPLAY COLOR (R,G,B)
　　　　　　　　　
[2] ------------------- SUMMARIZED VALUE
TITLE=TRANSMISSION LINE
SUM=OR
0=NORMAL,0,255,0
1=ABNORMAL,255,0,0

[3]
TITLE=PATH
SUM=OR
0=NORMAL,0,255,00
1=ABNORMAL,255,0,00

[4]
TITLE=SWITCHING
SUM=OR
0=ABSENT,128,128,128
1=PRESENT,0,255,255

[5]
TITLE=TESTING
SUM=OR
0=ABSENT,128,128,128
1=PRESENT,255,255,0

| SA | DA | SQ | CD | RP | LN | MS | ST | DATA PORTION |

HEADER PORTION

SA : SOURCE ADDRESS
DA : DESTINATION ADDRESS
SQ : SEQUENCE NUMBER
CD : CONTROL CODE
RP : RESPONSE CODE
LN : DATA LENGTH

MS : MASK PATTERN

ST : SUMMARY STATUS

FIG.20B

MSB → LSB

| DEVICE ALARM VALID/INVALID | TRANSMISSION-LINE ALARM VALID/INVALID | PATH ALARM VALID/INVALID | SWITCHING VALID/INVALID | TESTING VALID/INVALID | RESERVED | RESERVED | RESERVED |

FIG.20C

MSB → LSB

| DEVICE ALARM | TRANSMISSION-LINE ALARM | PATH ALARM | SWITCHING | TESTING | RESERVED | RESERVED | RESERVED |

FIG.28A

· STATUS-CONTROL MEMORY

| DEVICE #1 | 0 0 0 0 0 0 0 0 |
| --- | --- |
| | 1998/01/01  09:59:41 |
| #2 | 0 0 0 0 0 0 0 0 |
| | 1998/01/01  09:59:51 |
| #3 | 0 0 0 0 0 0 0 0 |
| | 1998/01/01  10:00:01 |
| GROUP #1 | 0 0 0 0 0 0 0 0 |
| | DEVICE #1 |
| | DEVICE #2 |
| | DEVICE #3 |
| GROUP #2 | SUMMARY STATUS |
| | DEVICE ID21 |
| | DEVICE ID22 |

FIG.28B

· POLLING TABLE

| POLLING INTERVAL | 10 SECONDS |
| --- | --- |
| NUMBER OF DEVICES | 3 |
| DEVICE ID | DEVICE #1 |
| TIME OF LATEST POLLING | 1998/01/01  09:59:41 |
| DEVICE ID | DEVICE #2 |
| TIME OF LATEST POLLING | 1998/01/01  09:59:51 |
| DEVICE ID | DEVICE #3 |
| TIME OF LATEST POLLING | 1998/01/01  10:00:01 |

FIG. 29A

· SUMMARY STATUS OF GROUP 1

| DEVICE | TRANSMIS-SION LINE | PATH | SWITCHING | TESTING |
|---|---|---|---|---|
| (GREEN) | (GREEN) | (GREEN) | (GRAY) | (GRAY) |

FIG. 29B

· LIST OF STATUS SUMMARIES

| LIST OF STATUS SUMMARIES | | | | | | | |
|---|---|---|---|---|---|---|---|
| DEVICE ADDRESS | DEVICE | TRANSMISSION LINE | PATH | SWITCHING | TESTING | ... | TIME OF UPDATE |
| DEVICE #1 | NORMAL | NORMAL | NORMAL | ABSENT | ABSENT | | 1998/01/01 9:59:41 |
| DEVICE #2 | NORMAL | NORMAL | NORMAL | ABSENT | ABSENT | | 1998/01/01 9:59:51 |
| DEVICE #3 | NORMAL | NORMAL | NORMAL | ABSENT | ABSENT | | 1998/01/01 10:00:01 |

FIG.30A

· STATUS-CONTROL MEMORY

| DEVICE #1 | 0 1 0 0 0 0 0 0 |
| --- | --- |
| | 1998/01/01 10:00:04 |
| #2 | 0 0 0 0 0 0 0 0 |
| | 1998/01/01 09:59:51 |
| #3 | 0 0 0 0 1 0 0 0 |
| | 1998/01/01 10:00:05 |

| GROUP #1 | 0 1 0 0 1 0 0 0 |
| --- | --- |
| | DEVICE #1 |
| | DEVICE #2 |
| | DEVICE #3 |

| GROUP #2 | SUMMARY STATUS |
| --- | --- |
| | DEVICE ID21 |
| | DEVICE ID22 |

FIG.30B

· POLLING TABLE

| POLLING INTERVAL | 10 SECONDS |
| --- | --- |
| NUMBER OF DEVICES | 3 |
| DEVICE ID | DEVICE #1 |
| TIME OF LATEST POLLING | 1998/01/01 09:59:41 |
| DEVICE ID | DEVICE #2 |
| TIME OF LATEST POLLING | 1998/01/01 09:59:51 |
| DEVICE ID | DEVICE #3 |
| TIME OF LATEST POLLING | 1998/01/01 10:00:01 |

FIG.31A

- SUMMARY STATUS OF GROUP 1

| DEVICE | TRANSMIS-SION LINE | PATH | SWITCHING | TESTING | ... |
|---|---|---|---|---|---|
| (GREEN) | (RED) | (GREEN) | (GRAY) | (VIOLET) | — |

FIG.31B

- LIST OF STATUS SUMMARIES

| LIST OF STATUS SUMMARIES | | | | | | |
|---|---|---|---|---|---|---|
| DEVICE ADDRESS | DEVICE | TRANSMISSION LINE | PATH | SWITCHING | TESTING | ... | TIME OF UPDATE |
| DEVICE #1 | NORMAL | ABNORMAL | NORMAL | ABSENT | ABSENT | | 1998/01/01 10:00:04 |
| DEVICE #2 | NORMAL | NORMAL | NORMAL | ABSENT | ABSENT | | 1998/01/01 9:59:51 |
| DEVICE #3 | NORMAL | NORMAL | NORMAL | ABSENT | PRESENT | | 1998/01/01 10:00:05 |

FIG.32A

· STATUS-CONTROL MEMORY

| DEVICE #1 | 0 1 0 0 0 0 0 0 |
| --- | --- |
| | 1998/01/01  10:00:04 |
| #2 | 0 0 0 0 0 0 0 0 |
| | 1998/01/01  09:59:51 |
| #3 | 0 0 0 0 1 0 0 0 |
| | 1998/01/01  10:00:05 |
| GROUP #1 | 0 1 0 0 1 0 0 0 |
| | DEVICE #1 |
| | DEVICE #2 |
| | DEVICE #3 |
| GROUP #2 | SUMMARY STATUS |
| | DEVICE ID21 |
| | DEVICE ID22 |

FIG.32B

· POLLING TABLE

| POLLING INTERVAL | 10 SECONDS |
| --- | --- |
| NUMBER OF DEVICES | 3 |
| DEVICE ID | DEVICE #1 |
| TIME OF LATEST POLLING | 1998/01/01  10:00:10 |
| DEVICE ID | DEVICE #2 |
| TIME OF LATEST POLLING | 1998/01/01  09:59:51 |
| DEVICE ID | DEVICE #3 |
| TIME OF LATEST POLLING | 1998/01/01  10:00:01 |

FIG. 33A

- SUMMARY STATUS OF GROUP 1

| DEVICE | TRANSMIS-SION LINE | PATH | SWITCHING | TESTING | ... |
|---|---|---|---|---|---|
| (GREEN) | (RED) | (GREEN) | (GRAY) | (VIOLET) | |

FIG. 33B

- LIST OF STATUS SUMMARIES

| DEVICE ADDRESS | DEVICE | TRANSMISSION LINE | PATH | SWITCHING | TESTING | ... | TIME OF UPDATE |
|---|---|---|---|---|---|---|---|
| DEVICE #1 | NORMAL | ABNORMAL | NORMAL | ABSENT | ABSENT | | 1998/01/01 10:00:04 |
| DEVICE #2 | NORMAL | NORMAL | NORMAL | ABSENT | ABSENT | | 1998/01/01 9:59:51 |
| DEVICE #3 | NORMAL | NORMAL | NORMAL | ABSENT | PRESENT | | 1998/01/01 10:00:05 |

FIG.34A

· STATUS-CONTROL MEMORY

| DEVICE #1 | 0 1 0 0 0 0 0 0 |
|---|---|
| | 1998/01/01 10:00:04 |
| #2 | 0 1 0 0 0 0 0 0 |
| | 1998/01/01 10:00:21 |
| #3 | 0 0 0 0 1 0 0 0 |
| | 1998/01/01 10:00:05 |

| GROUP #1 | 0 1 0 0 1 0 0 0 |
|---|---|
| | DEVICE #1 |
| | DEVICE #2 |
| | DEVICE #3 |

| GROUP #2 | SUMMARY STATUS |
|---|---|
| | DEVICE ID21 |
| | DEVICE ID22 |

FIG.34B

· POLLING TABLE

| POLLING INTERVAL | 10 SECONDS |
|---|---|
| NUMBER OF DEVICES | 3 |
| DEVICE ID | DEVICE #1 |
| TIME OF LATEST POLLING | 1998/01/01 10:00:10 |
| DEVICE ID | DEVICE #2 |
| TIME OF LATEST POLLING | 1998/01/01 10:00:21 |
| DEVICE ID | DEVICE #3 |
| TIME OF LATEST POLLING | 1998/01/01 10:00:01 |

FIG. 35A

· SUMMARY STATUS OF GROUP 1

| DEVICE | TRANSMIS-SION LINE | PATH | SWITCHING | TESTING | ... |
|---|---|---|---|---|---|
| (GREEN) | (RED) | (GREEN) | (GRAY) | (VIOLET) | |

FIG. 35B

· LIST OF STATUS SUMMARIES

| LIST OF STATUS SUMMARIES | | | | | | |
|---|---|---|---|---|---|---|
| DEVICE ADDRESS | DEVICE | TRANSMISSION LINE | PATH | SWITCHING | TESTING | ... | TIME OF UPDATE |
| DEVICE #1 | NORMAL | ABNORMAL | NORMAL | ABSENT | ABSENT | | 1998/01/01 10:00:04 |
| DEVICE #2 | NORMAL | ABNORMAL | NORMAL | ABSENT | ABSENT | | 1998/01/01 10:00:21 |
| DEVICE #3 | NORMAL | NORMAL | NORMAL | ABSENT | PRESENT | | 1998/01/01 10:00:05 |

FIG.36A

· STATUS-CONTROL MEMORY

| DEVICE #1 | 0 1 0 0 0 0 0 0 |
| --- | --- |
| | 1998/01/01 10:00:04 |
| #2 | 0 1 0 0 0 0 0 0 |
| | 1998/01/01 10:00:21 |
| #3 | 1 0 0 1 1 0 0 0 |
| | 1998/01/01 10:00:26 |
| GROUP #1 | 1 1 0 1 1 0 0 0 |
| | DEVICE #1 |
| | DEVICE #2 |
| | DEVICE #3 |
| GROUP #2 | SUMMARY STATUS |
| | DEVICE ID21 |
| | DEVICE ID22 |

FIG.36B

· POLLING TABLE

| POLLING INTERVAL | 10 SECONDS |
| --- | --- |
| NUMBER OF DEVICES | 3 |
| DEVICE ID | DEVICE #1 |
| TIME OF LATEST POLLING | 1998/01/01 10:00:10 |
| DEVICE ID | DEVICE #2 |
| TIME OF LATEST POLLING | 1998/01/01 10:00:21 |
| DEVICE ID | DEVICE #3 |
| TIME OF LATEST POLLING | 1998/01/01 10:00:01 |

FIG.37A

- SUMMARY STATUS OF GROUP 1

| DEVICE | TRANSMIS-SION LINE | PATH | SWITCHING | TESTING | ... |
|---|---|---|---|---|---|
| (RED) | (RED) | (GREEN) | (YELLOW) | (VIOLET) | |

FIG.37B

- LIST OF STATUS SUMMARIES

| DEVICE ADDRESS | DEVICE | TRANSMISSION LINE | PATH | SWITCHING | TESTING | ... | TIME OF UPDATE |
|---|---|---|---|---|---|---|---|
| DEVICE #1 | NORMAL | ABNORMAL | NORMAL | ABSENT | ABSENT | | 1998/01/01 10:00:04 |
| DEVICE #2 | NORMAL | ABNORMAL | NORMAL | ABSENT | ABSENT | | 1998/01/01 10:00:21 |
| DEVICE #3 | ABNORMAL | NORMAL | NORMAL | PRESENT | PRESENT | | 1998/01/01 10:00:26 |

FIG.38A

· STATUS-CONTROL MEMORY

| | |
|---|---|
| DEVICE #1 | 0 1 0 0 0 0 0 0 |
| | 1998/01/01 10:00:04 |
| #2 | 0 1 0 0 0 0 0 0 |
| | 1998/01/01 10:00:21 |
| #3 | 1 0 0 1 1 0 0 0 |
| | 1998/01/01 10:00:26 |
| GROUP #1 | 1 1 0 1 1 0 0 0 |
| | DEVICE #1 |
| | DEVICE #2 |
| | DEVICE #3 |
| GROUP #2 | SUMMARY STATUS |
| | DEVICE ID21 |
| | DEVICE ID22 |

FIG.38B

· POLLING TABLE

| | |
|---|---|
| POLLING INTERVAL | 10 SECONDS |
| NUMBER OF DEVICES | 3 |
| DEVICE ID | DEVICE #1 |
| TIME OF LATEST POLLING | 1998/01/01 10:00:10 |
| DEVICE ID | DEVICE #2 |
| TIME OF LATEST POLLING | 1998/01/01 10:00:21 |
| DEVICE ID | DEVICE #3 |
| TIME OF LATEST POLLING | 1998/01/01 10:00:30 |

FIG.39A

- SUMMARY STATUS OF GROUP 1

| DEVICE | TRANSMIS-SION LINE | PATH | SWITCHING | TESTING |
|---|---|---|---|---|
| (RED) | (RED) | (GREEN) | (YELLOW) | (VIOLET) |

FIG.39B

- LIST OF STATUS SUMMARIES

| LIST OF STATUS SUMMARIES | | | | | | | |
|---|---|---|---|---|---|---|---|
| DEVICE ADDRESS | DEVICE | TRANSMISSION LINE | PATH | SWITCHING | TESTING | ... | TIME OF UPDATE |
| DEVICE #1 | NORMAL | ABNORMAL | NORMAL | ABSENT | ABSENT | | 1998/01/01 10:00:04 |
| DEVICE #2 | NORMAL | ABNORMAL | NORMAL | ABSENT | ABSENT | | 1998/01/01 10:00:21 |
| DEVICE #3 | ABNORMAL | NORMAL | NORMAL | PRESENT | PRESENT | | 1998/01/01 10:00:26 |

FIG.40

[1] ←------------------ POSITION OF SUMMARY STATUS BIT
TITLE=DEVICE ←---------- NAME OF STATUS
SUM=OR ←--------------- SUMMARIZING METHOD
0=NORMAL,0,255,0
1=ABNORMAL,255,0,0 ←--- DISPLAY COLOR (R,G,B)
 ←------------------ SUMMARIZED VALUE
[2]
TITLE=TRANSMISSION LINE
SUM=OR
0=NORMAL,0,255,0
1=ABNORMAL,255,0,0

[3]
TITLE=PATH
SUM=OR
0=NORMAL,0,255,00
1=ABNORMAL,255,0,00

[4]
TITLE=SWITCHING
SUM=OR
0=ABSENT,128,128,128
1=PRESENT,0,255,255

[5]
TITLE=TESTING
SUM=OR
0=ABSENT,128,128,128
1=TESTING UNDERWAY,255,255,0

[6]
TITLE=ALARM SUPPRESSION
SUM=OR
0=ABSENT,128,128,128
1=PRESENT,0,255,255

· STATUS-CONTROL MEMORY

| | |
|---|---|
| DEVICE #1 | 0 1 0 0 0 0 0 0 |
| | 1998/01/01  10:00:04 |
| #2 | 0 1 0 0 0 0 0 0 |
| | 1998/01/01  10:00:21 |
| #3 | 1 0 0 1 1 0 0 0 |
| | 1998/01/01  10:00:26 |
| #4 | 0 0 0 0 0 0 0 0 |
| | 1998/01/01  10:00:30 |
| GROUP #1 | 1 1 0 1 1 0 0 0 |
| | DEVICE #1 |
| | DEVICE #2 |
| | DEVICE #3 |
| | DEVICE #4 |
| GROUP #2 | SUMMARY STATUS |
| | DEVICE ID21 |
| | DEVICE ID22 |

FIG.41B

· POLLING TABLE

| | |
|---|---|
| POLLING INTERVAL | 10 SECONDS |
| NUMBER OF DEVICES | 3 |
| DEVICE ID | DEVICE #1 |
| TIME OF LATEST POLLING | 1998/01/01  10:00:10 |
| DEVICE ID | DEVICE #2 |
| TIME OF LATEST POLLING | 1998/01/01  10:00:21 |
| DEVICE ID | DEVICE #3 |
| TIME OF LATEST POLLING | 1998/01/01  10:00:30 |
| DEVICE ID | DEVICE #4 |
| TIME OF LATEST POLLING | 1998/01/01  10:00:30 |

FIG. 42A

- SUMMARY STATUS OF GROUP 1

| DEVICE | TRANSMISSION LINE | PATH | SWITCHING | TESTING | ALARM SUPPRESSION | ... |
|---|---|---|---|---|---|---|
| (RED) | (RED) | (GREEN) | (YELLOW) | (VIOLET) | (GRAY) | |

FIG. 42B

- LIST OF STATUS SUMMARIES

| LIST OF STATUS SUMMARIES | | | | | | | |
|---|---|---|---|---|---|---|---|
| DEVICE ADDRESS | DEVICE | TRANSMISSION LINE | PATH | SWITCHING | TESTING | ALARM SUPPRESSION | ... | TIME OF UPDATE |
| DEVICE #1 | NORMAL | ABNORMAL | NORMAL | ABSENT | ABSENT | ABSENT | | 1998/01/01 10:00:04 |
| DEVICE #2 | NORMAL | ABNORMAL | NORMAL | ABSENT | ABSENT | ABSENT | | 1998/01/01 10:00:21 |
| DEVICE #3 | ABNORMAL | NORMAL | NORMAL | PRESENT | TESTING UNDERWAY | ABSENT | | 1998/01/01 10:00:26 |
| DEVICE #4 | NORMAL | NORMAL | NORMAL | ABSENT | ABSENT | ABSENT | | 1998/01/01 10:00:30 |

NETWORK MONITORING SYSTEM, MONITORING DEVICE, AND MONITORED DEVICE

BACKGROUND OF THE INVENTION

1. Field of the Invention

The present invention relates to a network monitoring system in which a monitoring device monitors and controls statuses of a plurality of monitored devices, and relates to the monitoring device and the plurality of monitored devices used in such a system.

2. Description of the Related Art

FIG. 1 is a schematic block diagram showing a network configuration in which a monitoring device monitors statuses of a plurality of monitored devices.

In the figure, a plurality of transmission devices #1 through #4 subjected to status monitoring are connected to a monitoring device via transmission lines. The monitoring device collects status information from each of the transmission devices.

FIG. 2 is a block diagram showing a related-art configuration of the monitoring device used in the network. FIG. 3 is a block diagram of a related-art configuration of the transmission device.

In FIG. 2, the monitoring device includes a communication unit 1, a transmission/receipt-control unit 2, a status-control unit 3a, a polling unit 4a, a status-control memory 5a, a polling table 7a, and a GUI unit 8a. The communication unit 1 is used for communicating with transmission devices. The transmission/receipt-control unit 2 is used for checking responses received from the transmission devices when the transmission devices send these responses in response to commands directed to the transmission devices, and, also, attends to processing of a series of transmitted frames.

The status-control memory 5a stores summary statuses of all the transmission devices provided in the network as well as summary statuses of groups of transmission devices organized by a predetermined group unit. Further, the status-control memory 5a is used for storing an update condition of the summary statuses.

FIG. 4 is an illustrative drawing showing a data structure used by the status-control memory 5a.

As shown in the figure, the summary status is stored with respect to each of the transmission devices #1, #2, and so on as well as with respect to each group #1, #2, and so on. Here, a given group is comprised of a plurality of transmission devices assembled as one unit according to areas where they are installed, functions they perform, etc. Identifications (IDs) of transmission devices which belong to a given group are also stored along with the summary status.

The summary status is comprised of 8 bits in this example. Starting from the most significant bit toward the least significant bit, each bit of the summary status represents such items as presence/absence of a device alarm, a presence/absence of a transmission-line alarm, presence/absence of a path alarm, presence/absence of switching, and presence/absence of testing, and the three remaining bits are reserved. The device alarm indicates whether there is abnormality regarding the pertinent transmission device. The transmission-line alarm and the path alarm indicate whether there is abnormality regarding transmission-lines and paths, respectively, used by the pertinent transmission device. The switching indicates whether there is a switch over to a backup system when the transmission device has a dual structure comprised of a system in operation and a backup system. The testing indicates whether the pertinent transmission device is under testing. The three reserved bits may be used for checking other alarm statuses in addition to the alarms described above. Here, a summary status means that this status is obtained as a sign for representing presence/absence of an alarm regarding a pertinent transmission device by taking a logic sum or the like of a plurality of alarms even when a plurality of different sections (e.g., packages) of the transmission device have their own alarms.

The polling table 7a is a memory used for controlling a polling order and transmission-device IDs of the transmission devices subjected to polling.

FIG. 5 is an illustrative drawing showing an exemplary configuration of the polling table 7a. The polling table 7a includes, as its items, a polling interval at which polling is conducted, a number of transmission devices subjected to polling, and IDs of the transmission devices which are stored in an order of polling. The polling unit 4a sends a polling command to each transmission device at such a polling interval as specified in the table in the polling order specified in the table.

The status-control unit 3a stores in the status-control memory 5a the summary statuses obtained from information sent from the transmission devices. The polling unit 4a controls the polling operation according to the contents of the polling table 7a so as to conduct successive polling with respect to the transmission devices provided in the network. The GUI unit 8a provides a graphical user interface such as a display screen for the purpose of providing an operator with a means of controlling and monitoring.

In FIG. 3, the transmission device includes a communication unit 11, a control unit 12a, a status-control unit 13a, an inter-package-communication unit 14, a status-control memory 15, and package-control units 16. The communication unit 11 is used for communicating with the monitoring device. The package-control units 16 are provided with respect to respective packages constituting the transmission device, and attend to control of these packages. The inter-package-communication unit 14 communicates with the package-control units 16, and collects a status of each package. The control unit 12a analyzes a control command sent from the monitoring device, and requests the package-control units 16 to conduct processing corresponding to the control command. Further, the control unit 12a transmits a response to the monitoring device via the communication unit 11. The status-control memory 15 stores the device's own statuses (e.g., a detailed status of each package and the like) as well as the summary status summarizing the device's own statuses for the control purposes. The status-control unit 13a stores and controls in the status-control memory 15 the status information obtained from the inter-package-communication unit 14. Further, the status-control unit 13a obtains the summary status, and stores it in the status-control memory 15.

In the following, an outline will be provided regarding the operations of the related-art monitoring network.

The related-art monitoring device keeps record of status changes in such items as alarms, switching, testing, and the like with respect to each transmission device as well as with respect to each section thereof which may experience such a change when such items are reported from the transmission devices. The monitoring device further keeps record of summary statuses by summarizing statuses of the individual transmission devices in the monitoring device, and displays the summary statuses. In this configuration, the monitoring device has a summary-status collecting command (i.e., a command for requesting a transmission device to send its summary status) as one of its commands, and uses this command as a polling command to perform polling with respect to each transmission device, thereby obtaining a summary status at constant intervals sent back as a response to the polling. This is done in order to avoid inconsistency between the statuses stored in the monitoring device and the actual statuses of the transmission device. To achieve this end, the monitoring device compares the summary statuses obtained as polling responses with the summary statuses stored inside the monitoring device, and recollects detailed statuses (i.e., alarms, switching, testing, etc.) from a transmission device if inconsistency is found by the comparison regarding this transmission device. The monitoring device further summarizes the recollected detailed statuses so as to insure consistency with the transmission device.

In what follows, an operation procedure will be described in detail with regard to each unit of the monitoring device.

FIGS. 6A and 6B are a flowchart showing a detailed operation of the status-control unit 3a of the monitoring device.

Data received from a transmission device is supplied to the status-control unit 3a via the communication unit 1 and the transmission/receipt-control unit 2. The status-control unit 3a is waiting for an arrival of the received data (step S71). Upon receiving the received data, the status-control unit 3a analyzes the contents thereof (step S72).

When the received data is alarm information such as a device alarm, a transmission-line alarm, a path alarm, or the like, a check is made as to whether the alarm information relates to a generation of an alarm or a recovery from an alarm condition (step S73). If it relates to generation of an alarm, data indicative of presence of an alarm is stored in a corresponding alarm field of a corresponding transmission-device filed in the status-control memory (step S74). If the received data relates to a recovery from an alarm condition, data indicative of presence of an alarm is removed from a corresponding alarm field of a corresponding transmission-device filed of the status-control memory (step S75). Then, statuses regarding generation of alarms are summarized within a group unit including the corresponding transmission device (step S76). Statuses of the whole network is then summarized (step S77). Based on this result, a request is made to the GUI unit 8a so as to change displayed statuses according to the updated summary statuses.

When the received data is status information that relates to a change in other statuses such as switching, testing, etc., a procedure comprised of steps similar to the above-described steps S73 through S78 is performed with respect to an item in a corresponding status field of a corresponding transmission device in the status-control memory 5a (steps S79 through S84).

When the received data is a summary status of a transmission device which the transmission device sends in response to a polling command or the like, a comparison is made between the received summary status and a corresponding summary status stored in the status-control memory 5a of the monitoring device (step S85). If a match is found, no further action is taken. If a mismatch is found, a status-information collecting command for requesting detailed status information is issued to the transmission device (step S86). The status-information collecting command includes an alarm-status collecting command, a switching-status collecting command, a testing-status collecting command, etc.

When the received data is a response sent from a transmission device responding to an alarm-status collecting command, for example, all the alarms regarding the transmission device are erased in the status-control memory 5a (step S87). The received data is then stored as an ongoing alarm for control purposes (step S88). Based on the contents of the stored data, a request is made to the GUI unit 8a to change displayed statuses (step S89).

FIG. 7 is a flowchart of a procedure performed by the polling unit 4a of the monitoring device.

A polling counter, which is used for indicating an ID number of a transmission device to be polled, is initialized to "1" (step S91). The polling counter is then referred to, and a polling command is issued to a transmission device indicated by the polling counter (step S92). A period of wait is instituted to wait for a response from the transmission device (step S93). Upon receiving a response, a summary status included in the response is supplied to the status-control unit 3a (step S94). A wait period is started to wait for an end of a polling interval defined in the polling table (step S95). After the passage of the polling interval, the polling counter is incremented by one (step S96), and the same procedure as described above will be performed with respect to a next transmission device according to the polling order.

FIG. 8 is a flowchart of a summary-status-list displaying process performed by the monitoring device.

The summary-status-list displaying process displays a list of summary statuses with respect to respective transmission devices. A device counter for indicating an ID number of a transmission device is cleared (step S101). A check is made whether a count of the device counter has reached to the total number of transmission devices (step S102). If the count is smaller, a summary-status displaying process is performed (step S103). In this manner, the summary-status displaying process is performed with respect to all the transmission devices.

FIG. 9 is a flowchart of the summary-status displaying process of the monitoring device with regard to a selected group of transmission devices.

A counter for indicating one of the items of a summary status is cleared first (step S101). Items of a summary status in this example include a device alarm, a transmission-line alarm, a path alarm, switching, testing, and three reserved bits as previously described in connection with FIG. 4. The total number of items in the summary status is thus 8. A check is made as to whether a count of the counter has become 8 (step S112). If it has not, the contents of the summary status of the selected group is read from the status-control memory 5a with respect to an item corresponding to the current count of the counter (step S113). Further, a check is made as to whether the obtained contents indicate a presence of the item (step S114). If presence of the item is indicated, the summary status is displayed so as to show an abnormal status (step S115). If absence of the item is indicated, the summary status is displayed so as to indicate a normal condition (step S116)

In what follows, an operation of the status-control unit 13a of the transmission device will be described in detail.

FIG. 10 is a flowchart of a procedure performed by the status-control unit 13a of the transmission device.

The status-control unit 13a receives status data of each package from the inter-package-communication unit 14 and command data from the monitoring device, as previously described. Initially, the status-control unit 13a waits for data to be received (step S121). Upon receiving the data, analysis of the contents is conducted (step S122).

When the received data is alarm data sent from the package-control units 16, a check is made as to whether the alarm data relates to generation of an alarm or a recovery from an alarm condition (step S123). If it relates to generation of an alarm, data indicative of presence of an alarm is stored in a corresponding package field of the status-control memory (step S124). If the received data relates to a recovery from an alarm condition, data indicative of presence of an alarm is removed from a corresponding package field of the status-control memory 15 (step S125). Then, statuses regarding generation of alarms are summarized for the transmission device (step S126). The summarized alarm information is sent to the monitoring device (step S127).

When the received data is a summary-status collecting command (i.e., polling command) sent from the monitoring device, the summary status of the transmission device is read from the status-control memory 15 (step S128), and is sent to the monitoring device as a response to the command (step S129).

FIG. 11 is a flowchart showing an operation of the control unit 12a.

As shown in the figure, the control unit 12a waits for arrival of data, and, upon receiving data, performs what needs to be performed in accordance with the received data. Then, a response is generated, and is sent to the monitoring device.

In what follows, a more detailed description will be given with regard to operations of the related-art system.

FIG. 12 is a sequence chart for explaining operations of the related-art system.

In this example, three transmission devices are provided as devices subjected to monitoring. At an initial state, all the three transmission devices are operating normally. In the figure, 8 digits in parenthesis following a polling command represent the 8 bits of a summary status. Each bit has an assigned function as previously explained in connection with FIG. 4. In this example, further, a polling interval is set to 10 seconds.

EVENT 1: The monitoring device performs a polling operation with respect to the transmission device #3 by issuing a polling command. Since the transmission device #3 is operating normally, a summary status included in a polling response is all zeros. This is shown in the figure as a polling response (00000000).

EVENT 2, 3: The transmission device #1 suffers a transmission-line alarm, so that the transmission device #1 sends a report to the monitoring device for the purpose of reporting detailed alarm information regarding the generation of the transmission-line alarm. One second after the generation of the transmission-line alarm, the transmission device #3 starts a test, so that the transmission device #3 sends to the monitoring device a report including detailed testing-status information regarding a start of the test.

In response, the monitoring device analyzes the received reports, and summarizes the reported details to generate a summary status. As a result, the transmission device #1 has a summary status (01000000), and the transmission device #3 has a summary status (00001000). These summary statuses are stored in the status-control memory 15.

EVENT 4: A transmission-line alarm is generated in the transmission device #2, and the transmission device #2 sends a report to the monitoring device for the purpose of reporting the transmission-line alarm. For some unexpected reason, however, the report does not reach the monitoring device. Because of this accident, an updated summary status (01000000) in the possession of the transmission device #2 is not known to the monitoring device, which does not even know any status change of the transmission device #2. The monitoring device keeps the same summary status as before for the transmission device #2. That is, the summary status in the monitoring device is (00000000), and there is a mismatch between these two summary statuses.

EVENT 5: A scheduled polling according to the polling intervals is conducted with respect to the transmission device #1. The transmission device #1 had a transmission-line alarm generated at EVENT 2, so that the summary status thereof is (01000000). A response to the polling is thus sent to the monitoring device with the summary status (01000000).

EVENT 6: The transmission device #3 suffers generation of a device alarm and switching, and makes an attempt to report these to the monitoring device. For some unexpected reason, however, the report does not reach the monitoring device. The summary status in the possession of the transmission device #3 is (10011000) because of the accumulation of the events that took place since the initial state. However, the summary status in the monitoring device remains (00001000), creating a mismatch.

EVENT 7, 8: A polling scheduled according to the polling intervals is conducted against the transmission device #2. The transmission device #2 had the transmission-line alarm generated at EVENT 4, and, thus, has a summary status that is (01000000). A polling response is sent to the monitoring device along with this summary status (01000000). At this point of time, the summary status of the monitoring device is still (00000000), creating a mismatch. The monitoring device issues an alarm collecting command to the transmission device #2 in order to collect detailed information on alarms from the transmission device #2. The detailed information is sent from the transmission device #2 to the monitoring device by way of a response to the alarm collecting command.

EVENT 9: A polling is conducted with respect to the transmission device #3 according to the schedule defined by the polling intervals. The transmission device #3 has the summary status (10011000) after EVENT 6, and sends this summary status to the monitoring device by way of a polling response. Since the generation of the device alarm and switching are not reported to the monitoring device, the monitoring device keeps a summary status of (01000000) with respect to the transmission device #3. A mismatch is thus present between the record of the monitoring device and the summary status included in the polling response. In this case, the monitoring device issues an alarm collecting command to the transmission device #3 so as to collect detailed information on alarms from the transmission device #3. Further, the monitoring device issues a switching-status collecting command to the transmission device #3, and obtains detailed information about the switching status from the transmission device #3 by receiving a response to the switching-status collecting command.

FIG. 13 is an illustrative drawing showing a status of the status-control memory of the monitoring device after the sequence as described above is performed. As shown in the figure, the summary status of the transmission device #1 is (01000000), and the summary status of the transmission device #2 is (01000000). Also, the transmission device #3 has a summary status (10011000).

FIG. 14A is an illustrative drawing showing an example of a display showing the summary statuses of the entire network. As shown in the figure, the device alarm and the transmission-line alarm are highlighted in red, which indicates presence of alarms. The path alarm is shown in green, indicating no alarm. A red color is also used for the switching so as to indicate presence of switching. The testing is shown in violet, which indicates that a test is underway.

FIG. 14B is an illustrative drawing of an example of a display which shows a list of summary statuses. This display shows a summary status of each transmission device as well as each group by using text information. In this example, the transmission devices #1 and #2 are shown as having an abnormal status with respect to the transmission line. The transmission device #3 has an abnormal device status, and is shown with an indication that the switching and the testing are present.

In the related-art monitoring scheme, the monitoring device and the monitored devices keep duplicate records regarding statuses of the monitored devices. If a report from a monitored device does not reach the monitoring device for some reason, an inconsistency is created between the monitoring device and the monitored device. When such an inconsistency is found, the monitoring device attempts to collect all the detailed information from the monitored device.

This scheme involves complicated processing on the part of the monitoring device, and, also, adds to busy traffic on monitoring lines by collecting the detailed information. A failure of reporting tends to occur when a multiple of alarms are generated. When a command for collecting detailed information is issued from the monitoring device in such a case, a monitoring line which is already congested may be further congested.

Moreover, detection of inconsistency is always associated with a polling operation. This means that an inconsistency is detected only when a polling operation is performed. This is the case even when the monitoring device and a monitored device having inconsistency therebetween have other communications in addition to a polling operation.

Further, the way the monitoring device summarizes statuses is basically fixed. If there is a need to change the way the statuses are summarized upon a user request or the like, a pertinent program needs to be rewritten. If statuses to be monitored are different for different types of monitored devices, the monitoring device has a burden to identify such a difference. This makes it difficult to add a new status to be monitored.

Accordingly, there is a need for a network monitoring system which can resolve inconsistency of summary statuses between the monitoring device and monitored devices without a need for the monitoring device to actively collect status information in response to a result of an polling operation.

SUMMARY OF THE INVENTION

Accordingly, it is a general object of the present invention to provide a network monitoring system which can satisfy the need described above.

It is another and more specific object of the present invention to provide a network monitoring system which can resolve inconsistency of summary statuses between the monitoring device and monitored devices without a need for the monitoring device to actively collect status information in response to a result of an polling operation.

In order to achieve the above object according to the present invention, a network monitoring system includes a network, a monitoring device connected to the network, and a plurality of monitored devices connected to the network, each of the monitored devices having various statuses thereof summarized as a summary status, and sending the summary status to the monitoring device when sending a response in reply to a summary-status collecting command issued from the monitoring device as well as when sending other information that is not the response, wherein the monitoring device controls the summary status of a given one of the monitored devices based on the summary status received from the given one of the monitored devices.

In the network monitoring system described above, all information sent from a monitored device to the monitoring device is provided with the summary status of the monitored device. This configuration makes it possible for the monitoring device to learn the latest summary status without conducting a summary-status collecting operation, thereby reducing the processing load and traffic. Further, since detection and correction of inconsistency between the monitoring device and the monitored devices can be attained without waiting for a polling operation, it is possible to obtain the latest statuses of the monitored devices at an earlier timing than in the related-art configuration.

According to another aspect of the present invention, the network monitoring system as described above is such that each of said monitored devices sends the summary status to said monitoring device by inserting the summary status into a predetermined area provided in a header portion of a communication frame directed to said monitoring device.

According to another aspect of the present invention, the network monitoring system as described above is such that each of said monitored devices sends to said monitoring device valid/invalid information indicating which item of the summary status is valid, and the monitored device controls one or more items of the summary status with respect to a given one of the monitored devices only if the one or more items are valid with respect to the given one of the monitored devices.

In the network monitoring system as described above, since valid/invalid information (e.g., a mask pattern) is provided for the purpose of indicating a valid/invalid status of each item of the summary status, a common header can be used by different types of devices (i.e., devices having different summary-status items to be collected). Further, even when a device of a new type is added to the network, there is no need to make a change to units concerning the monitoring operation and the graphical user interface. This results in an improved efficiency in system development.

According to another aspect of the present invention, the network monitoring system as described above is such that said monitoring device includes a status-display table which defines how to summarize summary statuses with respect to a given group of the monitored devices, and obtains the summary status of the given group of the monitored devices in accordance with what is defined in said status-display table.

In the network monitoring device described above, a change to the way of summarizing summary statuses is easily made simply by changing the status-display table in the monitoring device. This makes it easier to achieve user-specific customization, resulting in an increased user satisfaction and an improved efficiency in the system development.

According to another aspect of the present invention, the network monitoring system as described above is such that said monitoring device includes a status-display table which defines how to display each item of the summary status, and displays each item of the summary status in accordance with what is defined in said status-display table.

In the network monitoring system as described above, the form of display of the summary status (i.e., in terms of colors, letters, bit-map information, etc) can be changed simply by rewriting the status-display table. This results in an increased user satisfaction and an improved efficiency in the system development.

According to another aspect of the present invention, the network monitoring system as described above is such that said monitoring device keeps record of a time of a latest updating of the summary status with respect to each of said monitored devices, and displays the time along with the summary status.

In the network monitoring system as described above, the monitoring device keeps record of the time of updating of the summary status, so that reliability of the summary status regarding a particular monitored device can be judged based on the time of updating, thereby enhancing the reliability of the monitoring device.

According to another aspect of the present invention, the network monitoring system as described above is such that said monitoring device issues the summary-status collecting command in a polling operation performed at constant intervals, and skips a given polling operation scheduled for a given one of the monitored devices when the summary status is updated during a latest one of the constant intervals based on said other information sent from the given one of the monitored devices.

In the network monitoring system as described above, a scheduled polling operation is skipped with respect to a given monitored device if this device has the summary status thereof updated in the monitoring device since the last polling operation. This reduces the processing load on the monitoring device and the monitored devices, and reduces traffic.

Other objects and further features of the present invention will be apparent from the following detailed description when read in conjunction with the accompanying drawings.

BRIEF DESCRIPTION OF THE DRAWINGS

FIG. 14A is an illustrative drawing showing an example of a display showing summary statuses of the entire network;

FIG. 14B is an illustrative drawing of an example of a display which shows a list of summary statuses;

FIG. 15 is a block diagram of a monitoring device according to an embodiment of the present invention;

FIG. 18 is an illustrative drawing showing an example of a status-display table;

FIG. 20A is an illustrative drawing showing a format of a communication frame which is sent from a transmission device to the monitoring device;

FIG. 20B is an illustrative drawing showing a mask pattern,

FIG. 20C is an illustrative drawing showing a summary status.

FIGS. 28A and 28B are illustrative drawings showing the contents of tables;

FIGS. 29A and 29B are illustrative drawings showing examples of a displayed group summary status and a displayed list of summary statuses, which are displayed under control of the GUI unit;

FIGS. 30A and 30B are illustrative drawings showing the contents of the tables after EVENT 2;

FIGS. 31A and 31B are illustrative drawings showing the displayed group summary status and the displayed list of summary statuses after EVENT 2;

FIGS. 32A and 32B are illustrative drawings showing the contents of the tables after EVENT 4;

FIGS. 33A and 33B are illustrative drawings showing the displayed group summary status and the displayed list of summary statuses after EVENT 4;

FIGS. 34A and 34B are illustrative drawings showing the contents of the tables after EVENT 5;

FIGS. 35A and 35B are illustrative drawings showing the displayed group summary status and the displayed list of summary statuses after EVENT 5;

FIGS. 36A and 36B are illustrative drawings showing the contents of the tables after EVENT 7;

FIGS. 37A and 37B are illustrative drawings showing the displayed group summary status and the displayed list of summary statuses after EVENT 7;

FIGS. 38A and 38B are illustrative drawings showing the contents of the tables after EVENT 8;

FIGS. 39A and 39B are illustrative drawings showing the displayed group summary status and the displayed list of summary statuses after EVENT 8;

FIG. 40 is an illustrative drawing showing a status-display table in a case where a device for controlling a status of alarm suppression as one of the summary status items is added according to another embodiment of the present invention;

FIGS. 41A and 41B are illustrative drawings showing the contents of tables in the case where the device having an alarm-suppression status is added as in an example of FIG. 40; and FIGS. 42A and 42B are illustrative drawings showing examples of screen display.

DESCRIPTION OF THE PREFERRED EMBODIMENTS

In the following, embodiments of the present invention will be described with reference to the accompanying drawings.

Figure 1:
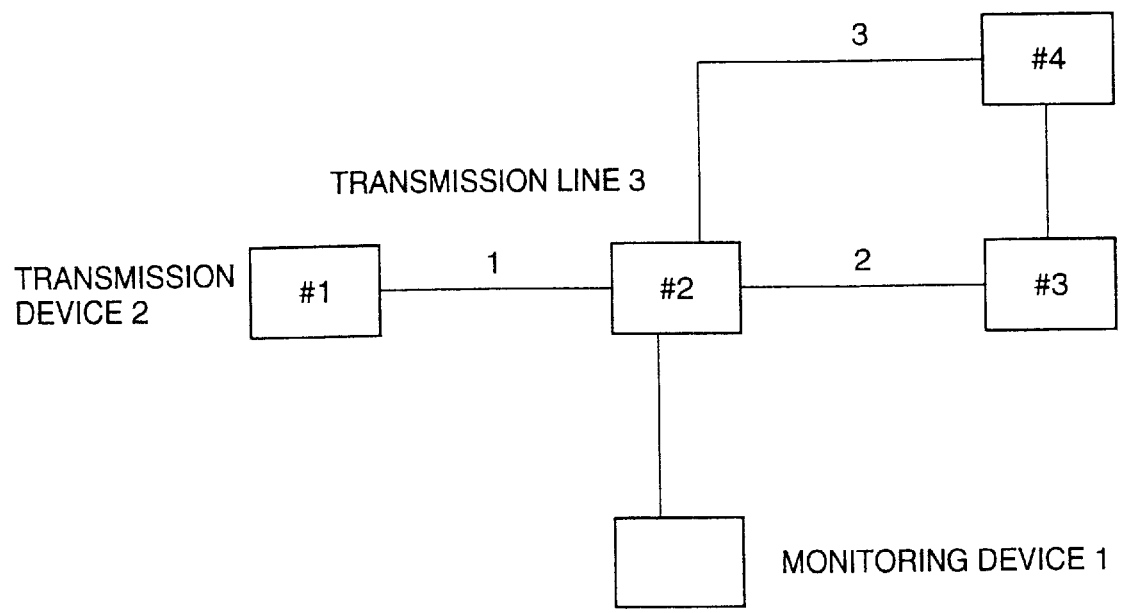
FIG. 1 is a schematic block diagram showing a network configuration in which a monitoring device monitors statuses of a plurality of monitored devices.
Figure 2:
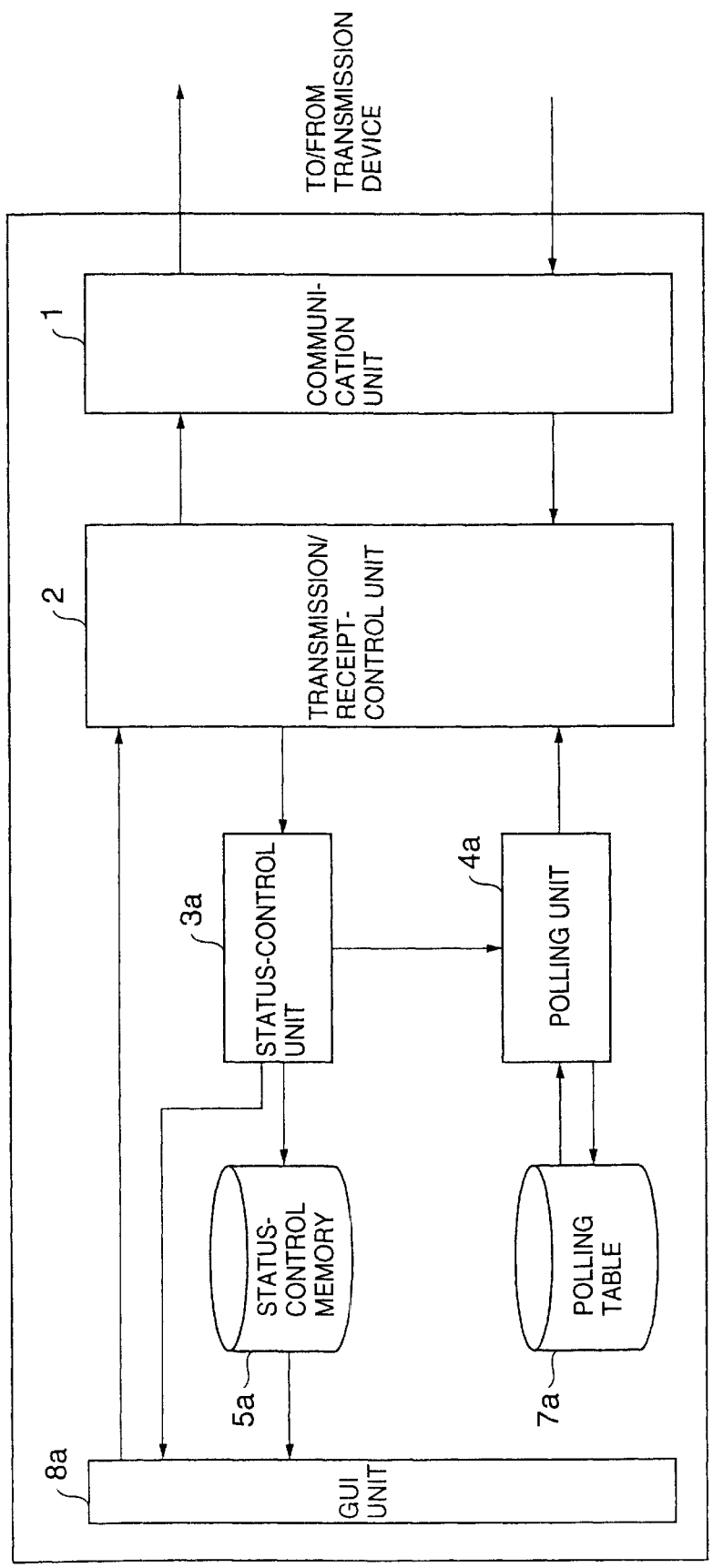
FIG. 2 is a block diagram showing a related-art configuration of the monitoring device used in the network.

A monitoring network to which the present invention is applied is the same as that of FIG. 1 described with reference to the related-art network.

Figure 16:
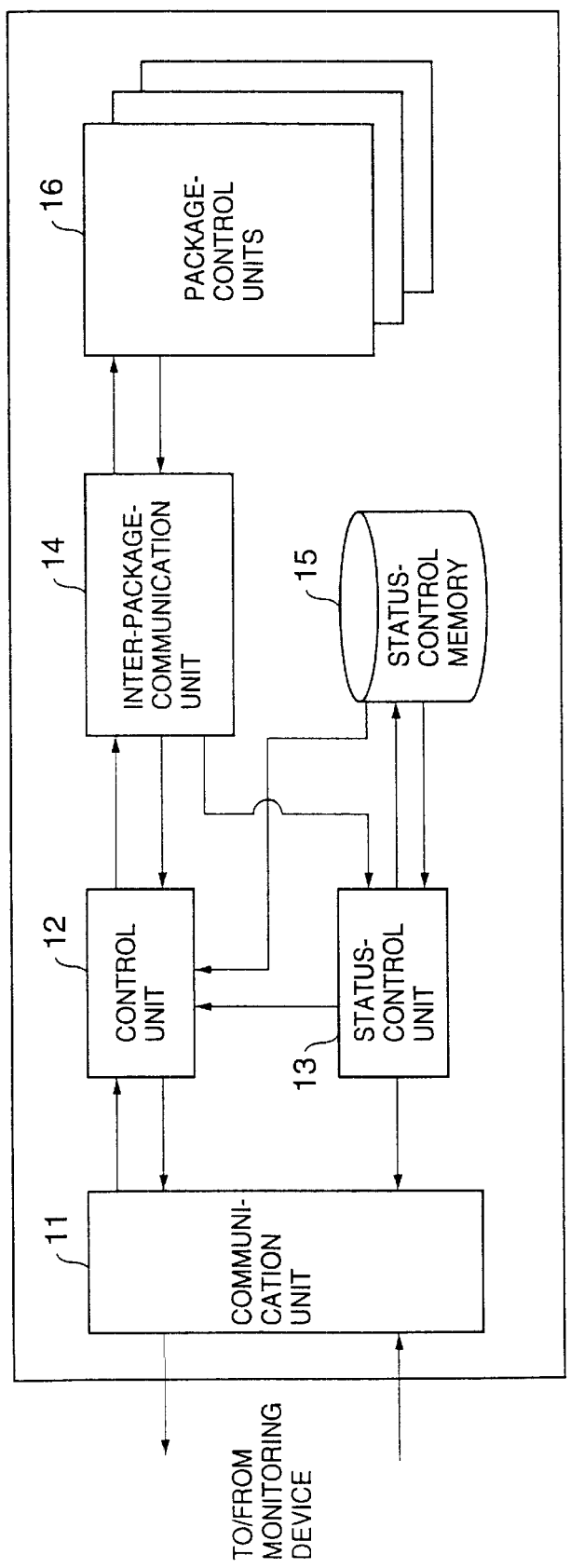
FIG. 16 is a block diagram of a transmission device acting as a monitored device according to the embodiment of the present invention.

FIG. 15 is a block diagram of a monitoring device according to an embodiment of the present invention. FIG. 16 is a block diagram of a transmission device acting as a monitored device according to the embodiment of the present invention.

The monitoring device of FIG. 15 includes the communication unit 1, the transmission/receipt-control unit 2, a status-control unit 3, a polling unit 4, a status-control memory 5, a status-display table 6, a polling table 7, and a GUI unit 8. The communication unit 1 is used for communicating with monitored devices. The transmission/receipt-control unit 2 is used for checking responses received from the transmission devices when the transmission devices send these responses in response to commands directed to the transmission devices, and, also, attends to processing of a series of transmitted frames.

The status-control memory 5 stores summary statuses of all the transmission devices provided in the network as well as summary statuses of groups of transmission devices organized by a predetermined group unit. Further, the status-control memory 5a is used for storing an update condition of the summary statuses, a date and time of the update, etc.

Figure 17:
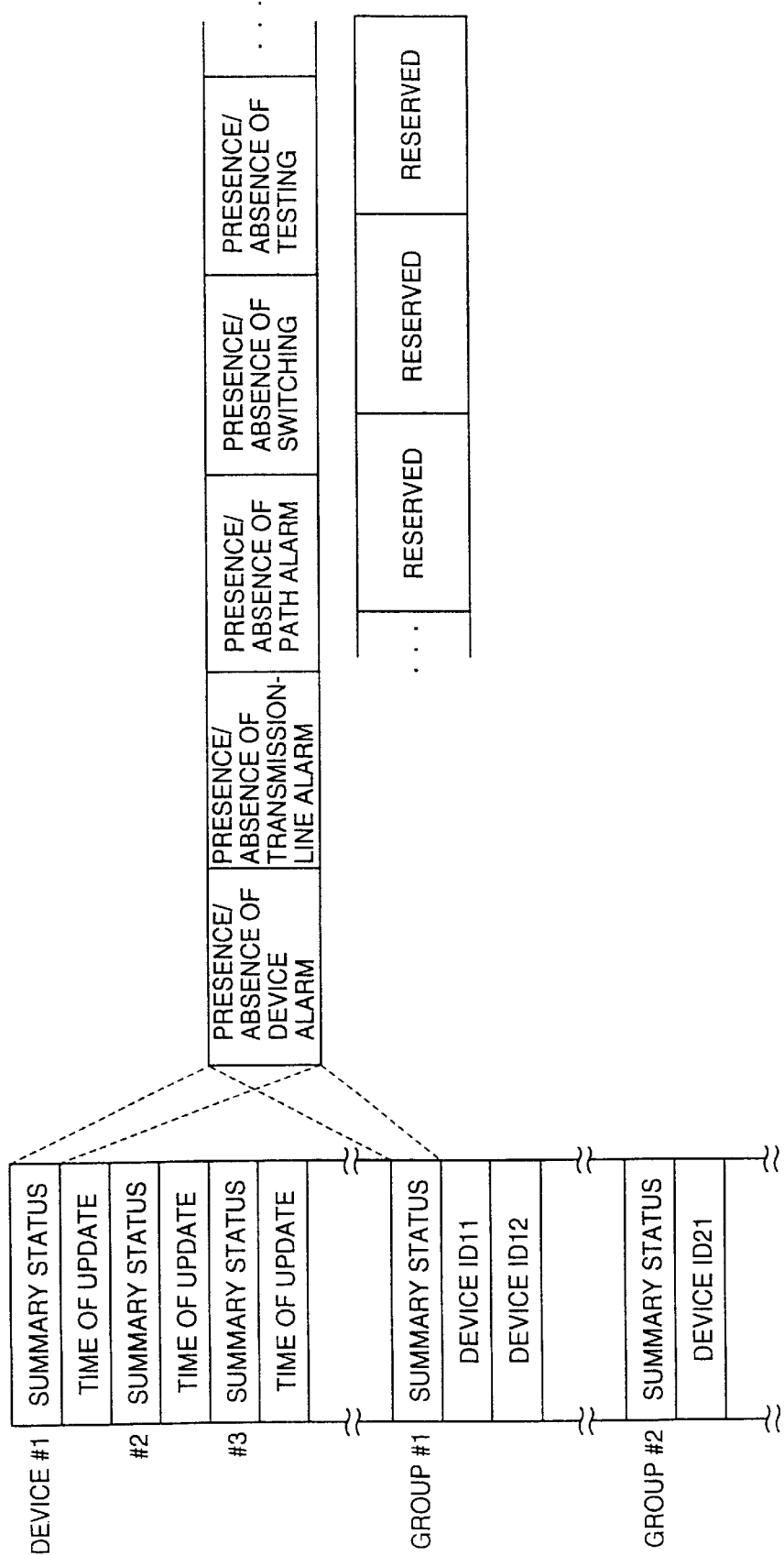
FIG. 17 is an illustrative drawing showing a data structure used by a status-control memory.

FIG. 17 is an illustrative drawing showing a data structure used by the status-control memory 5.

As shown in the figure, a summary status and a date and time of update are stored with respect to each of the transmission devices #1, #2, and so on. With respect to each of the groups #1, #2, and so on, a summary status (group summary status) and identifications (IDs) of transmission devices in the group are stored. In this example, the summary status is comprised of 8 bits, and includes a device alarm, a transmission-line alarm, a path alarm, switching, testing, and three reserved bits, as previously described in connection with the related-art scheme.

The status-display table 6 is used for defining a method of summarizing statuses for each group and for defining form of status display (color, letters, and the like), and is stored in a memory.

FIG. 18 is an illustrative drawing showing an example of the status-display table.

As shown in the figure, each item of the summary status (8 items in this example) has display information thereof stored in the table. The display information of each item includes a position of the summary-status bit (indicating an ordinal position which a pertinent item holds in the series of 8 items), a name of a status item (i.e., a device alarm, a transmission-line alarm, etc.), a method of summarizing statuses (e.g., obtaining a summary status by taking a logic sum with respect to all the transmission devices within a given group), and display colors. Display colors give definition of colors used for displaying a status of each item, and are comprised of data regarding a ratio of the three primary colors (red R, green G, and blue B). In the case of the device alarm of item [1], for example, a display color for a normal condition (no alarm) is defined as (0, 255, 0), which is green, and a display color for an abnormal condition is defined as (255, 0, 0), which is red.

The polling table 7 stores IDs of the transmission devices subjected to polling in an order in which these devises are polled, and stores a date and time of polling with respect to each transmission device for the purpose of indicating a date and time of the latest polling. The polling table 7 is stored in the memory.

Figure 19:
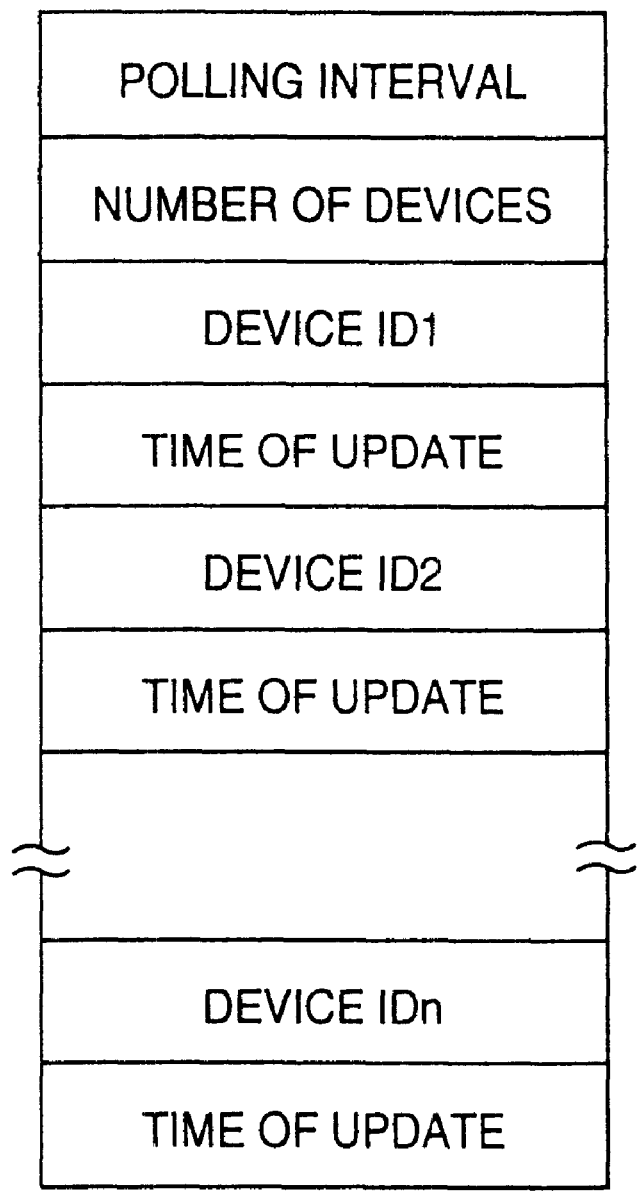
FIG. 19 is an illustrative drawing showing an exemplary data configuration of a polling table.

FIG. 19 is an illustrative drawing showing an exemplary data configuration of the polling table 7.

The polling table 7 includes a polling interval at which polling is conducted, a number of transmission devices subjected to polling, IDs of the transmission devices, and a time stamp of the latest polling performed on each transmission device. The time stamp includes a date (year, month, and a day) and time of the polling.

The status-control unit 3 stores in the status-control memory 5 the summary statuses obtained from information sent from the transmission devices. Also, the status-control unit 3 summarizes statuses with respect to each group by using a corresponding method of summarizing statuses defined in the status-display table 6. The polling unit 4 conducts successive polling operations with respect to the transmission devices provided in the network in accordance with the contents of the polling table 7. The polling unit 4 skips a polling operation when a status change has taken place since the last polling. The GUI unit 8 provides a graphical user interface such as a display screen for the purpose of providing an operator with a means of controlling and monitoring.

Figure 3:
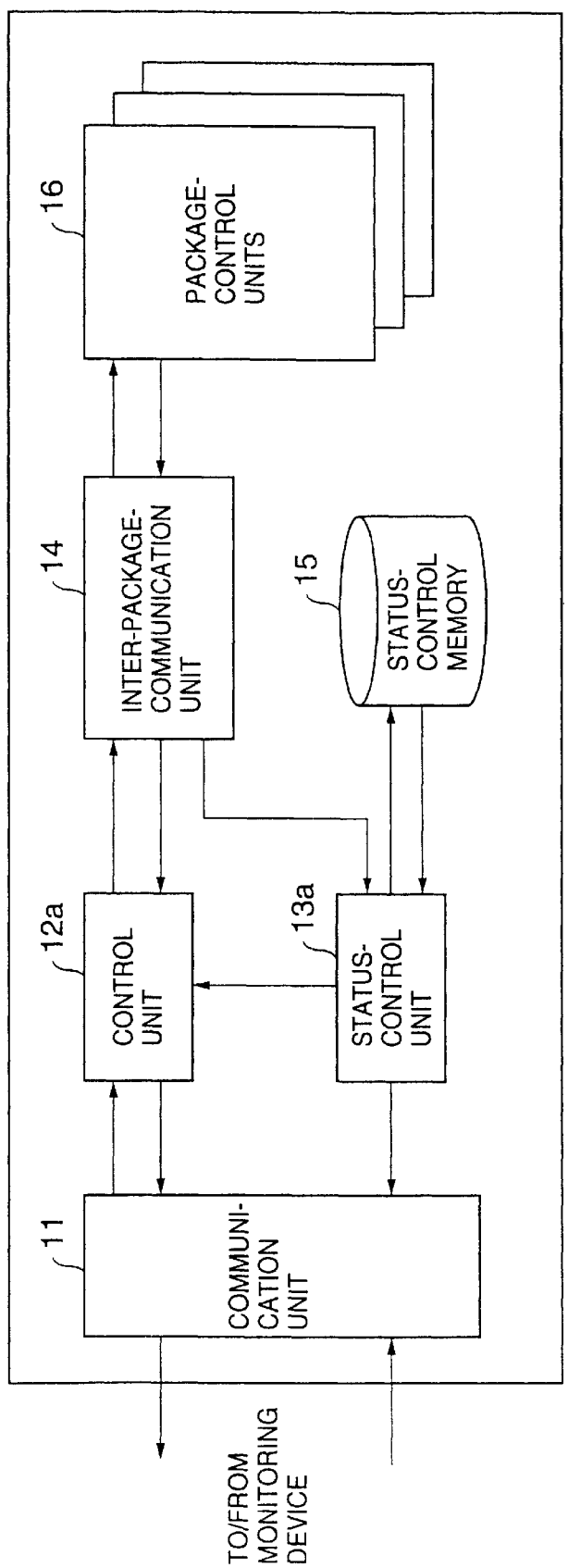
FIG. 3 is a block diagram of a related-art configuration of a transmission device.
Figure 4:
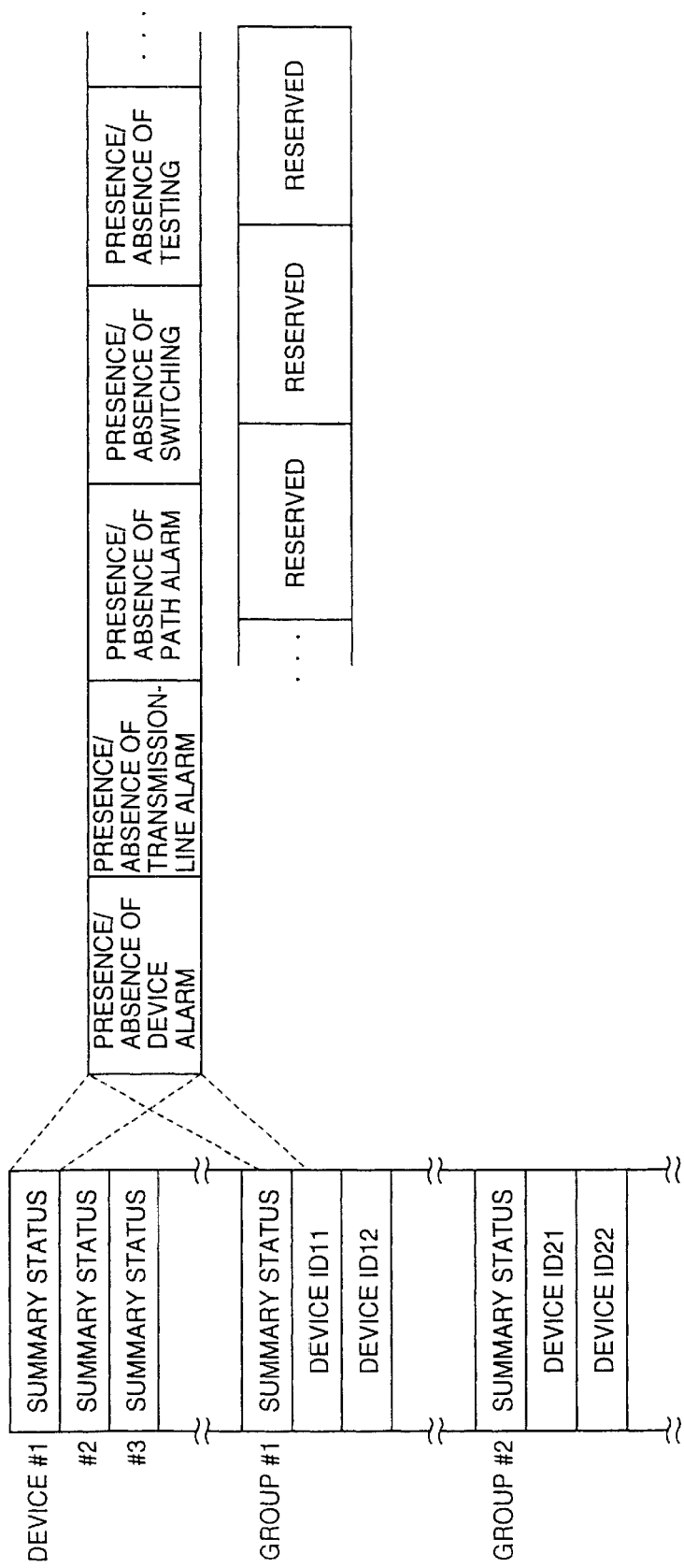
FIG. 4 is an illustrative drawing showing a data structure used by a status-control-memory.
Figure 5:
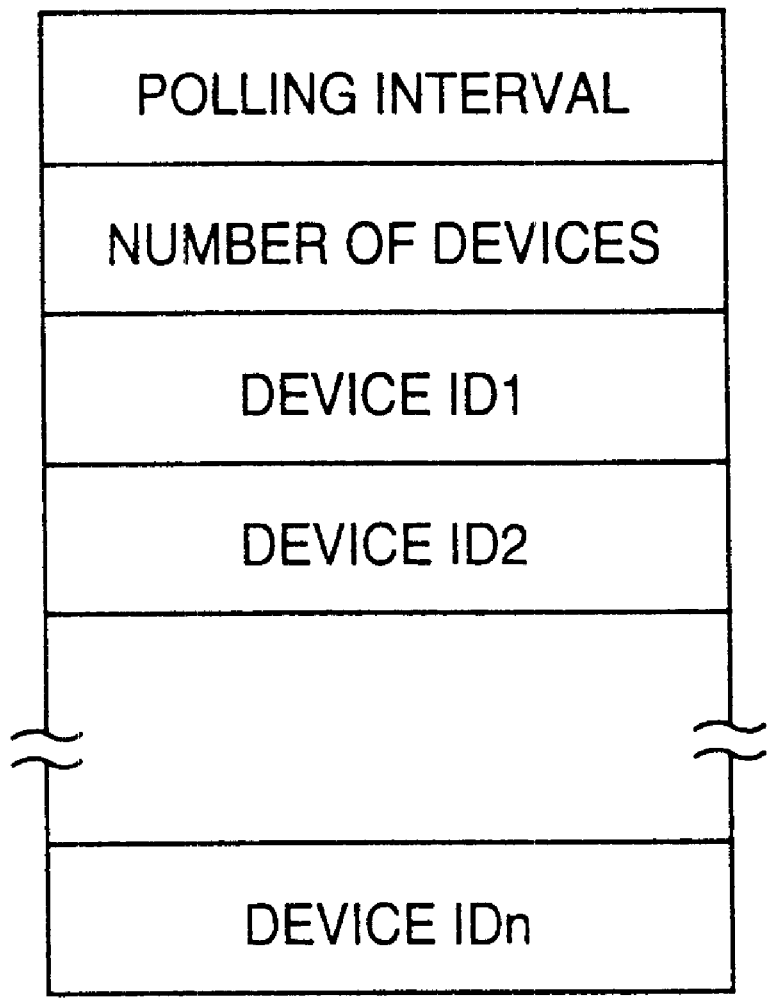
FIG. 5 is an illustrative drawing showing an exemplary configuration of a polling table.
Figure 6A:
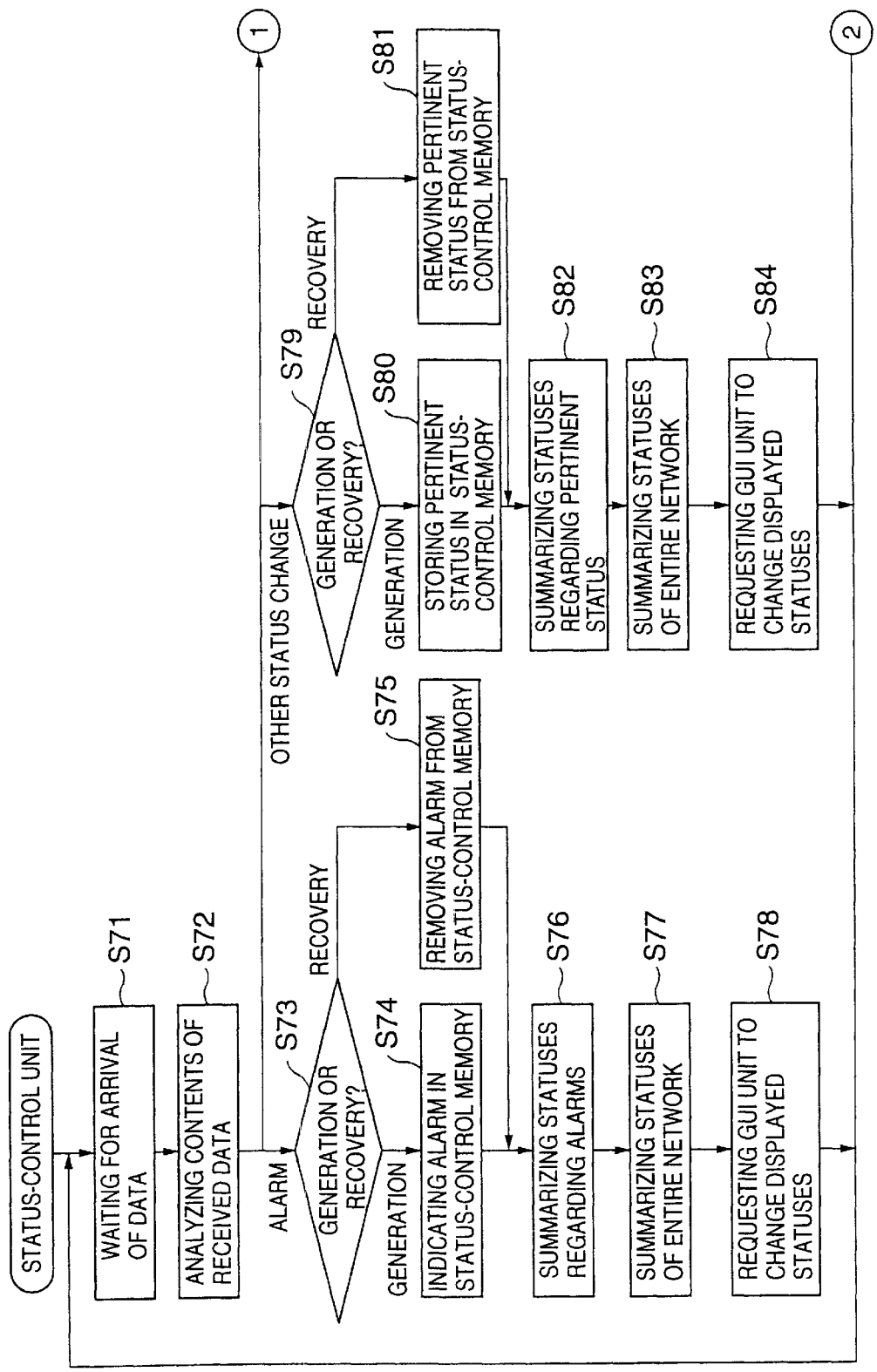
FIGS. 6A and 6B are a flowchart showing a detailed operation of a status-control unit of the monitoring device.
Figure 6B:
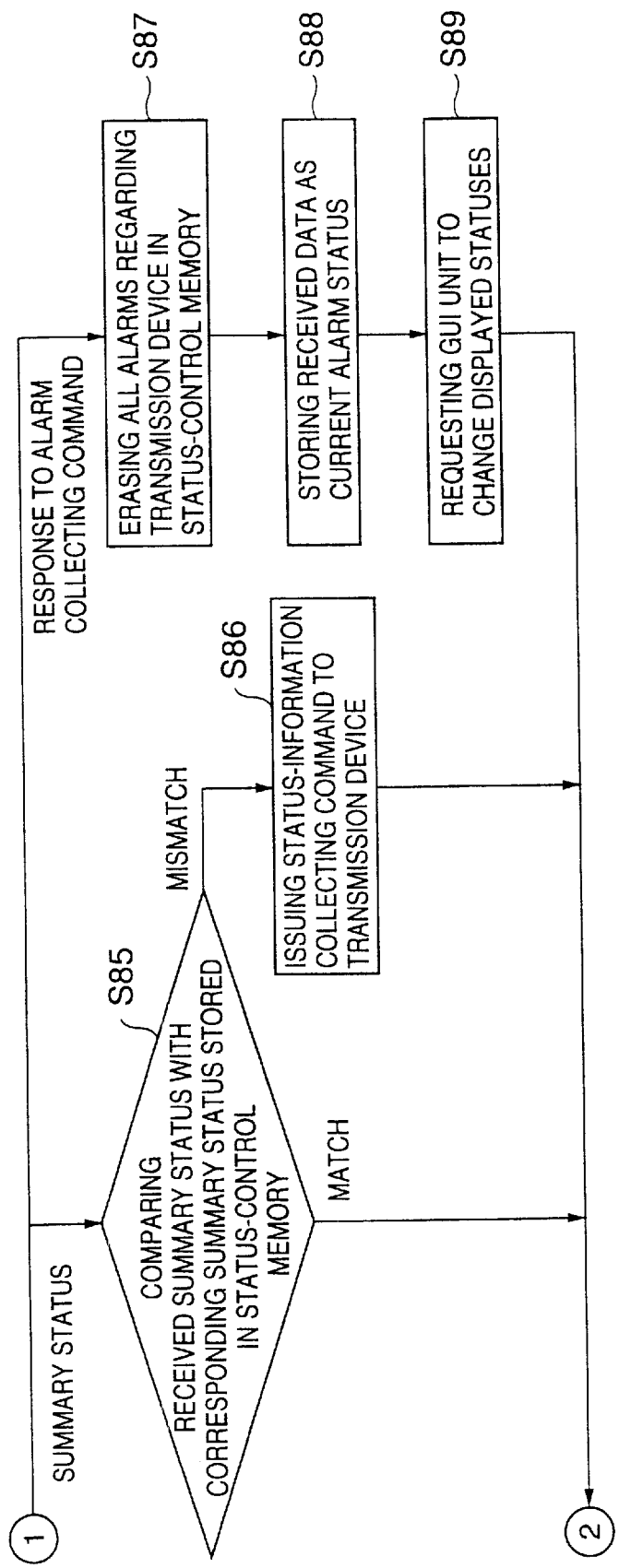
Figure 7:
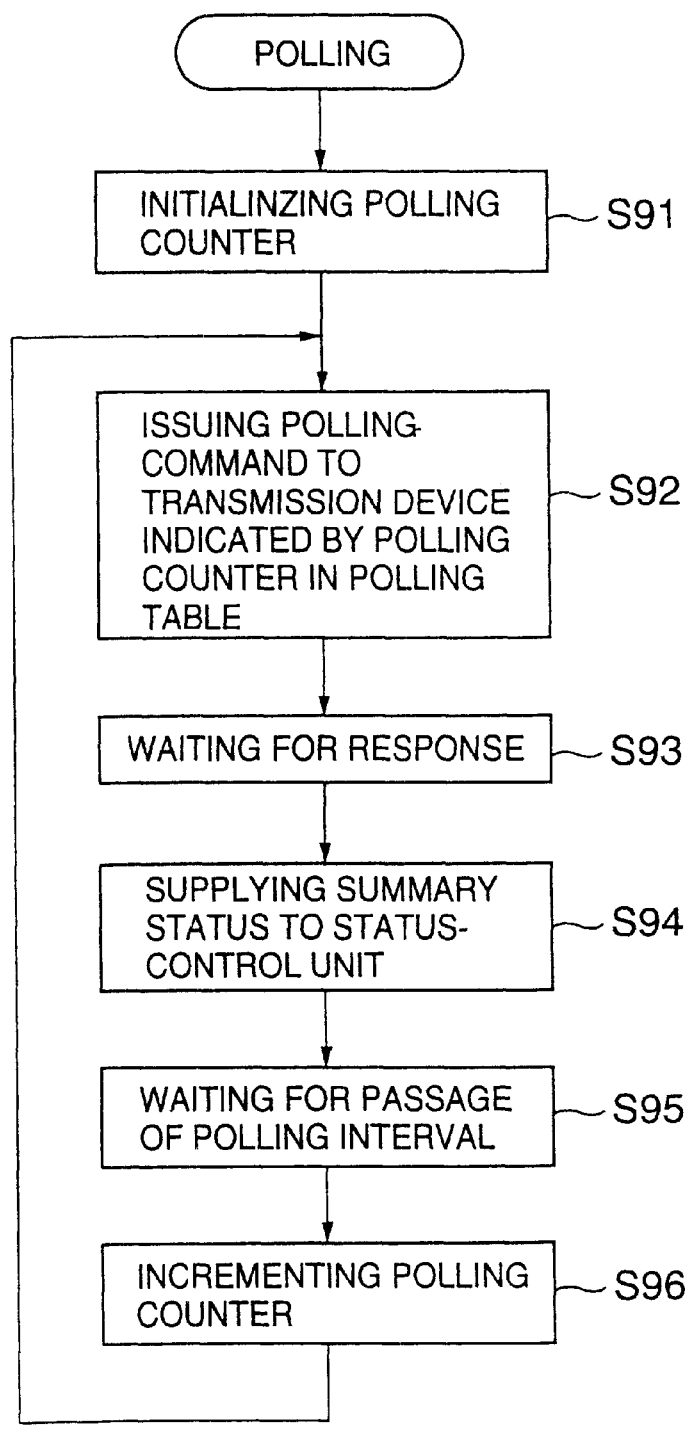
FIG. 7 is a flowchart of a procedure performed by a polling unit of the monitoring device.
Figure 8:
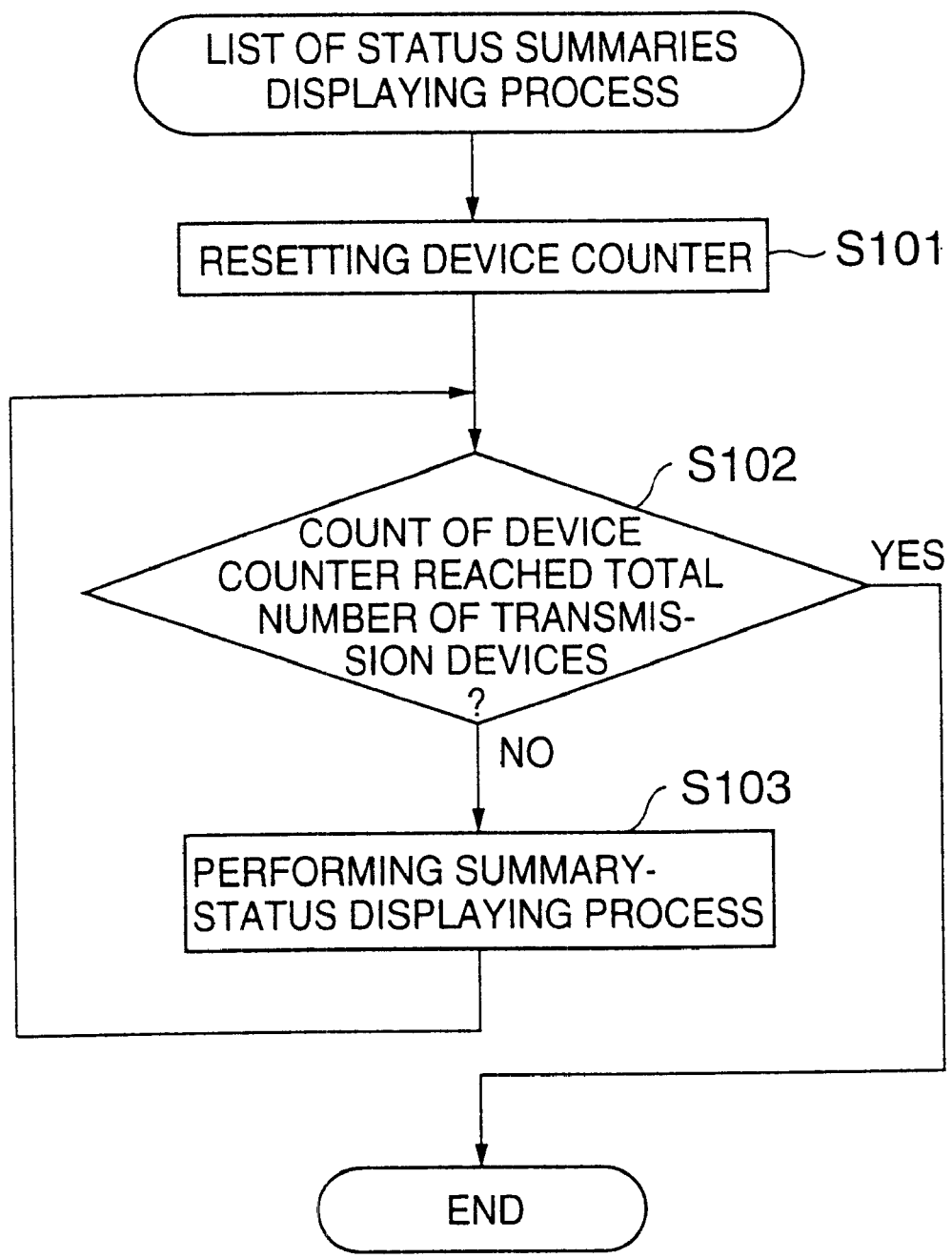
FIG. 8 is a flowchart of a summary-status-list displaying process performed by the monitoring device.
Figure 9:
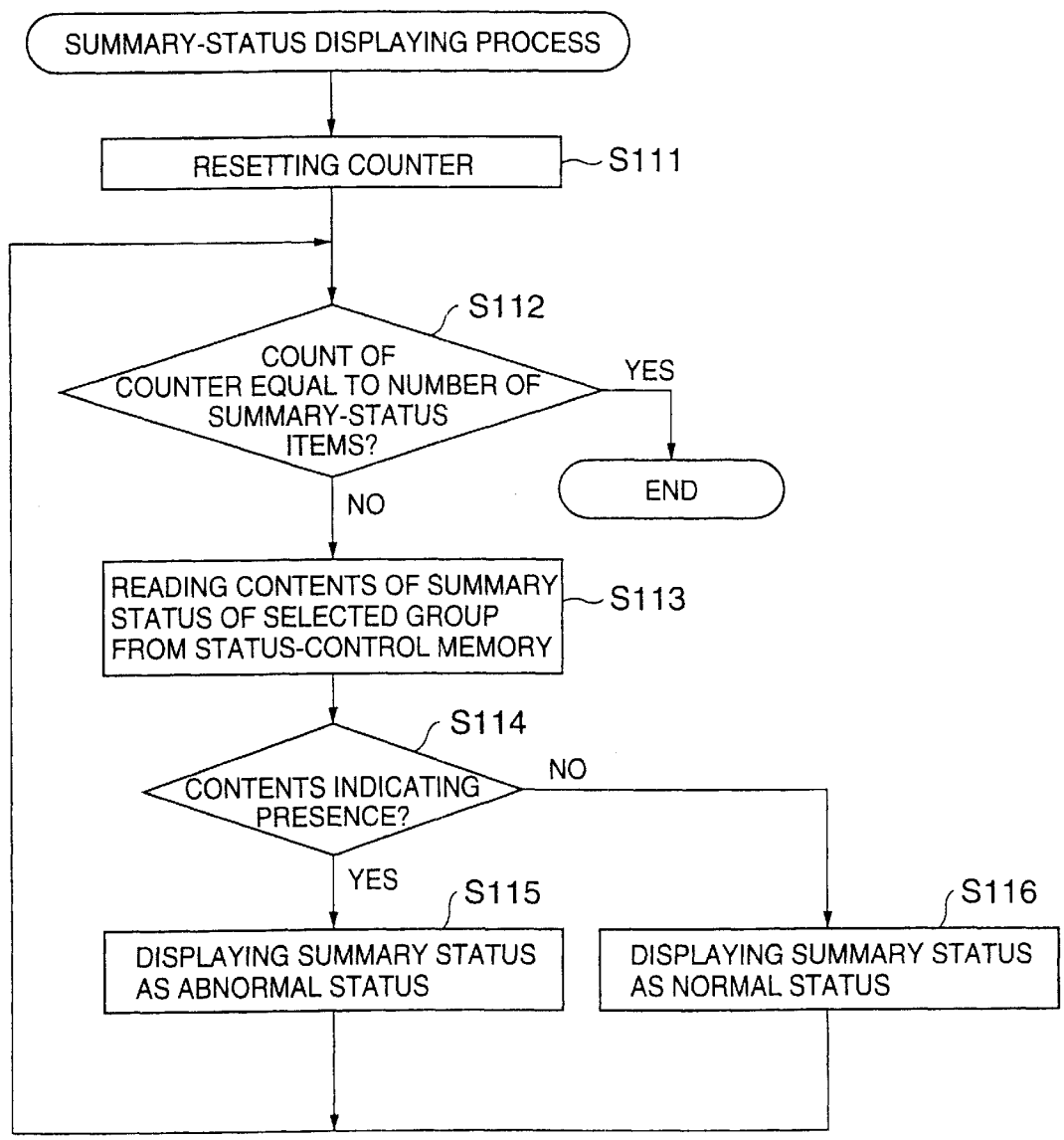
FIG. 9 is a flowchart of a summary-status displaying process of the monitoring device with regard to a selected group of transmission devices.
Figure 10:
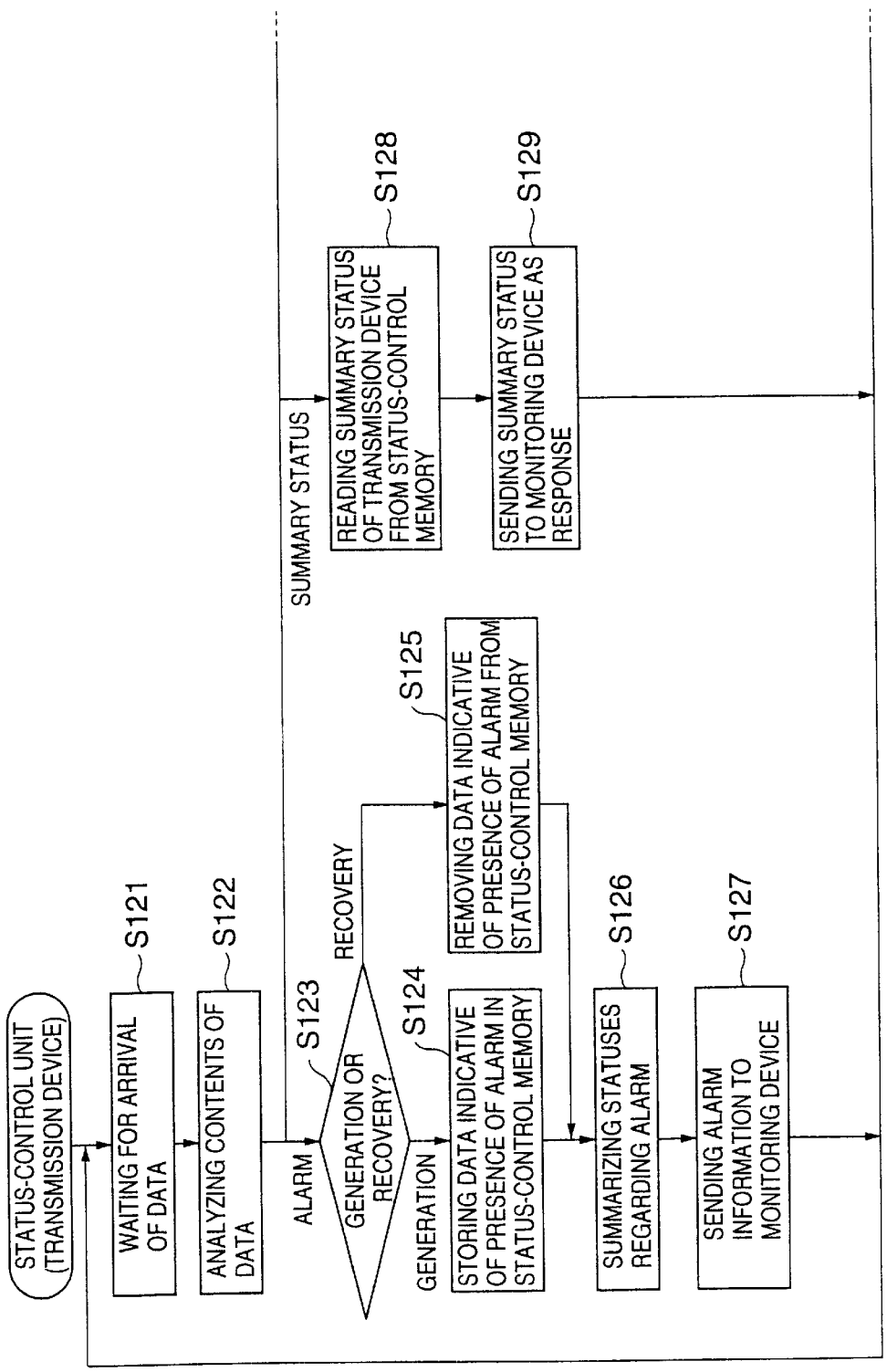
FIG. 10 is a flowchart of a procedure performed by the status-control unit of the transmission device.
Figure 11:
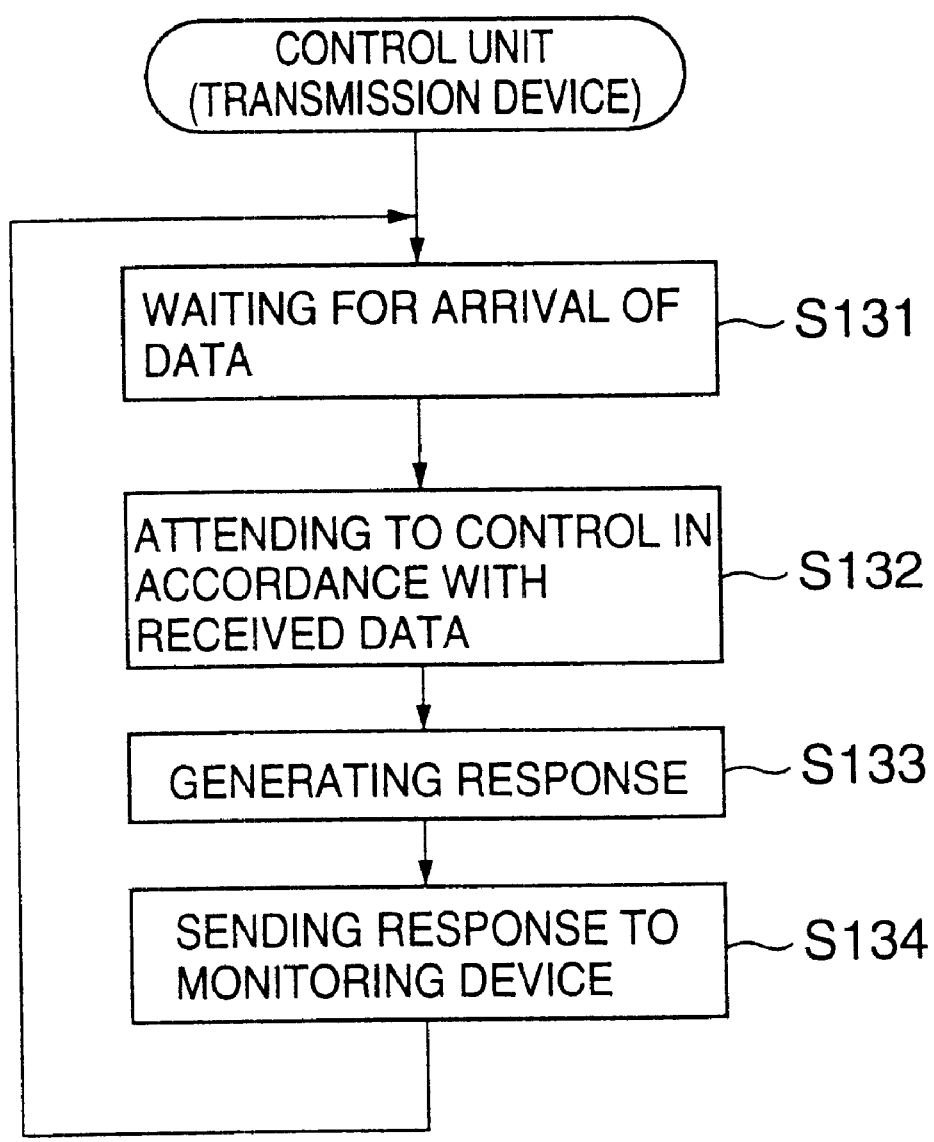
FIG. 11 is a flowchart showing an operation of a control unit.
Figure 12:
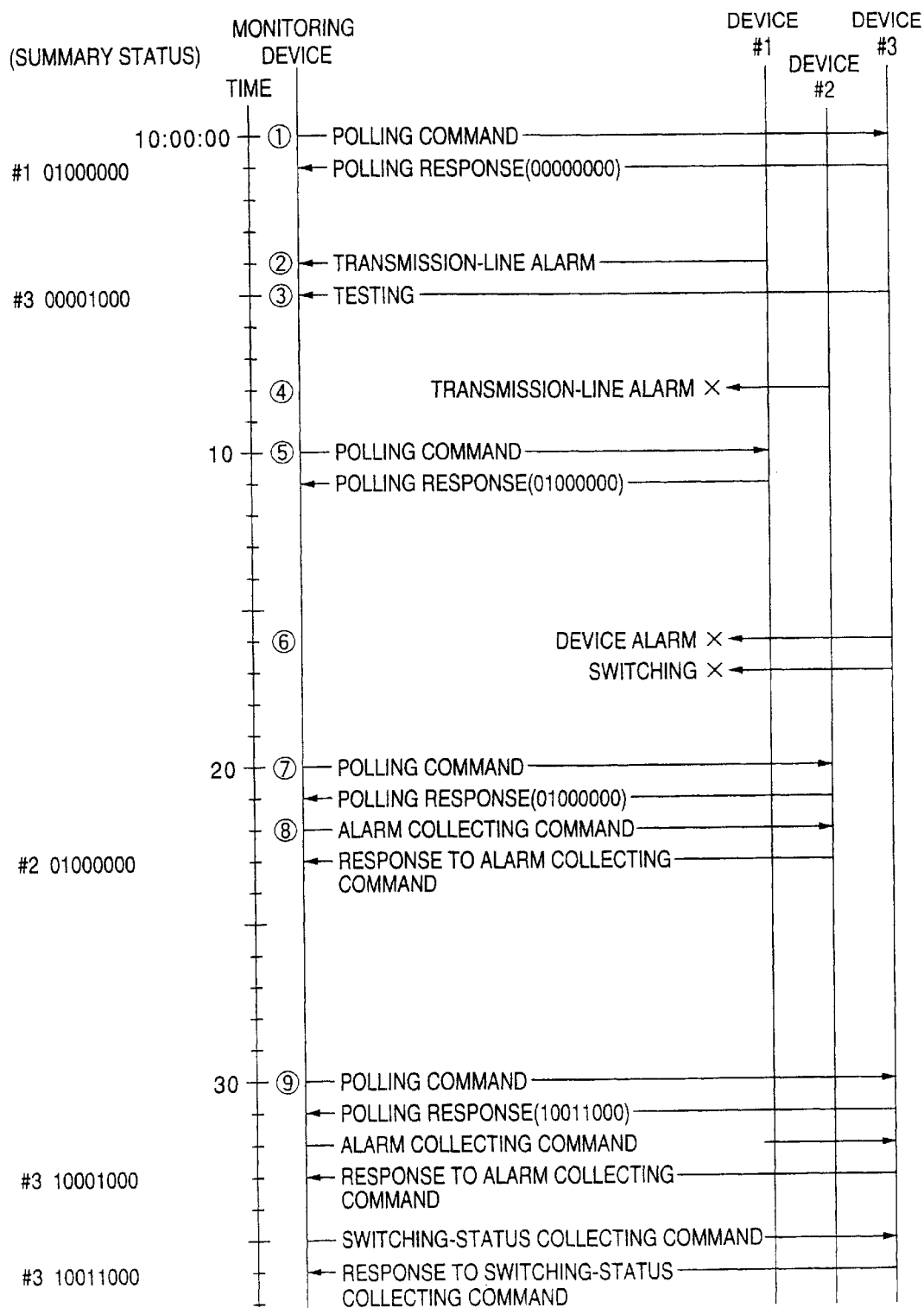
FIG. 12 is a sequence chart for explaining operations of the related-art system.
Figure 13:
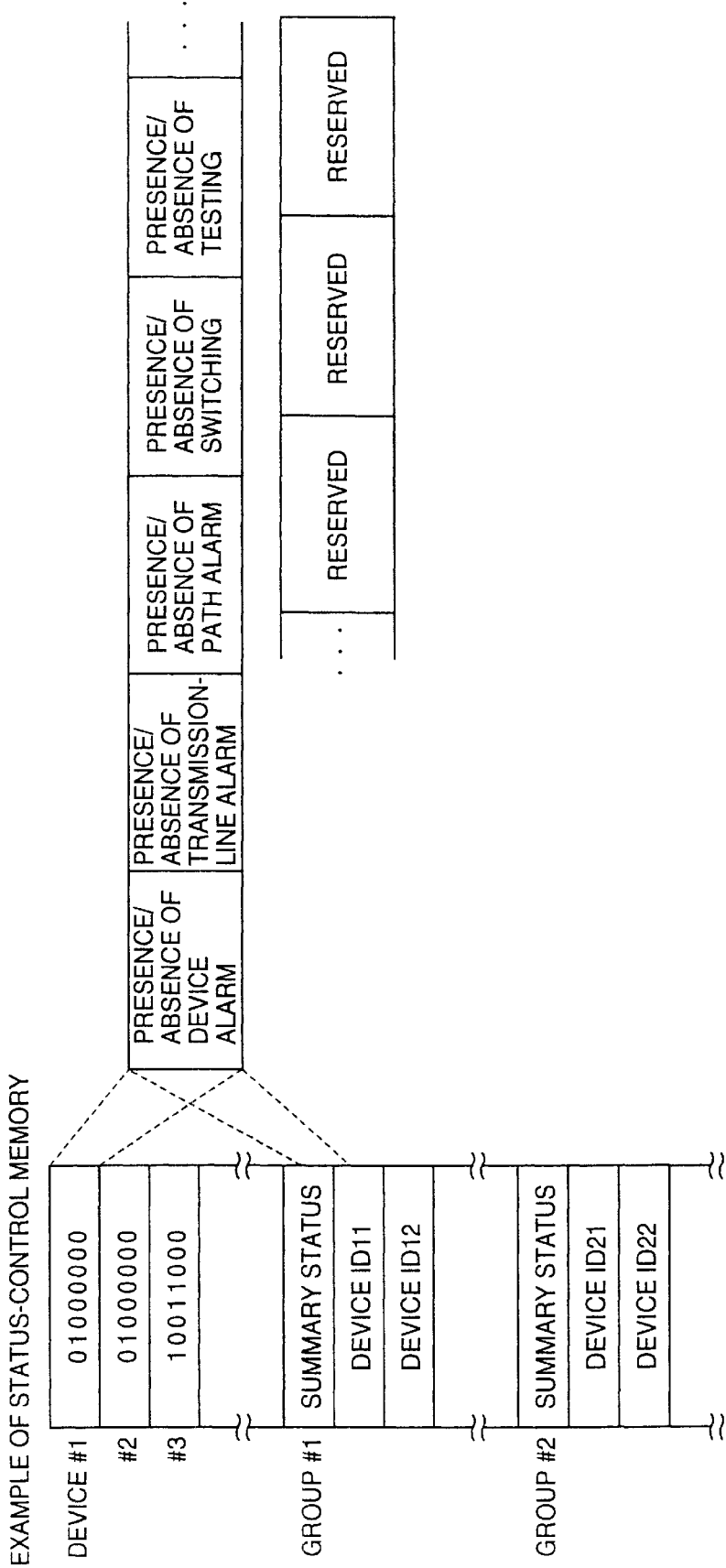
FIG. 13 is an illustrative drawing showing an example of a status of the status-control memory of the monitoring device.

In FIG. 3, the transmission device includes the communication unit 11, a control unit 12, a status-control unit 13, the inter-package-communication unit 14, the status-control memory 15, and the package-control units 16. The communication unit 11 is used for communicating with the monitoring device. The package-control units 16 are provided with respect to respective packages constituting the transmission device, and attend to control of these packages for the purpose of controlling a status and a status change of each package. The inter-package-communication unit 14 communicates with the package-control units 16, and collects a status of each package. The control unit 12 analyzes a control command sent from the monitoring device, and requests the package-control units 16 to conduct processing corresponding to the control command. Further, the control unit 12 transmits a response to the monitoring device via the communication unit 11. The status-control memory 15 stores the device's own statuses as well as the summary status summarizing the device's own statuses for the control purposes. The status-control unit 13 stores and controls in the status-control memory 15 the status-change information obtained from the package-control units 16. Further, the status-control unit 13 obtains the summary status, and stores it in the status-control memory 15.

FIG. 20A is an illustrative drawing showing a format of a communication frame which is sent from a transmission device to the monitoring device. The communication frame includes a header portion for storing control data and a data portion for storing data to be transmitted. The control data of the header portion includes a transmission-source address SA, a transmission-destination address DA, a sequence number SQ, a control code CD, a response code RP, a data length LN, a mask pattern MS, and a summary status ST. Here, the mask pattern MS and the summary status ST are added to the header as new items according to the present invention.

FIG. 20B is an illustrative drawing showing the mask pattern. FIG. 20C is an illustrative drawing showing the summary status.

An area of the summary status includes each status item of the monitored device (i.e., 8 bits in total). The mask pattern MS is comprised of 8 bits corresponding to respective bits of the summary status ST, and indicates a valid status of a corresponding item of the summary status ST when this item is valid (e.g., the valid status is indicated by "1"). For a device which does not have a dual structure, for example, information on presence/absence of switching is not necessary. In this case, a bit of the mask pattern MS corresponding to the switching is set to invalid or OFF (e.g., set to "0"). In this example, the summary status ST indicates presence/absence of each status item by one bit, but may alternatively indicate a total number of items which are present. Further, the summary status may be provided as a summary of each section such as each package rather than a summary of the entire monitored device.

In the following, operations of the monitoring device and the transmission device according to this embodiment will be described with reference to corresponding flowcharts.

Figure 21:
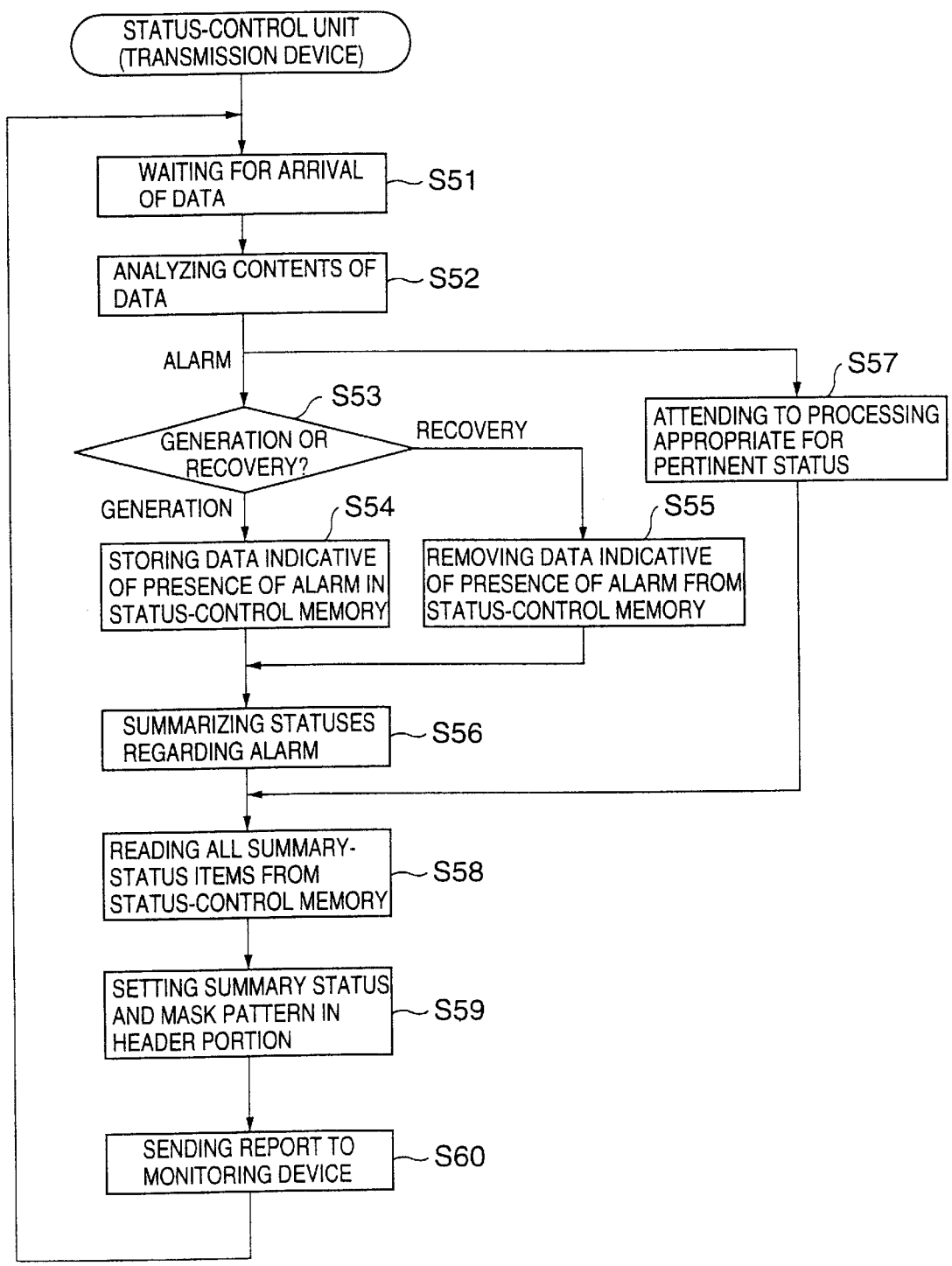
FIG. 21 is a flowchart of a procedure performed by a status-control unit of the transmission device according to the embodiment.

FIG. 21 is a flowchart of a procedure performed by the status-control unit 13 of the transmission device according to the embodiment.

A device alarm or the like detected by the package-control units 16 is reported to the status-control unit 13. The status-control unit 13 waits for arrival of alarm data or the like which is detected by the package-control units 16 with respect to each package (step S51). Upon receiving the data, analysis of the contents is conducted (step S52). When the received data is alarm data (e.g., a device alarm, a transmission-line alarm, a path alarm, or the like), a check is made as to whether the alarm data relates to generation of an alarm or a recovery from an alarm condition (step S53). If it relates to generation of an alarm, data indicative of presence of an alarm is stored in the status-control memory 15 (step S54). If the received data relates to a recovery from an alarm condition, data indicative of presence of an alarm is removed from the status-control memory 15 (step S55). Then, the contents of the status-control memory 15 are checked to examine existing alarms, and statuses regarding generation of alarms are summarized. The summarized alarm information indicative of presence/absence of any alarm is stored in the status-control memory 15 (step S56).

When the received data relates to other statuses such as switching, testing, etc., the contents thereof are stored in the status-control memory 15 in the same manner as in the case of an alarm, and a summary status summarizing the contents is also stored (step S57). In this example, presence/absence of switching or presence/absence of testing is summarized and stored as a summary status in the status-control memory 15.

After this, all the summary-status items (a device alarm, a transmission-line alarm, a path alarm, switching, and testing) are read from the status-control memory 15 (step S58). The summary status ST (which is equal to 0x80 if all the statuses are normal) and the mask pattern MS (0xF8 in this example by setting all the defined bits to ON) are attached to the header portion of a communication frame such as used for a information report (step S59), and are sent to the monitoring device as part of the report information (step S60).

Figure 22:
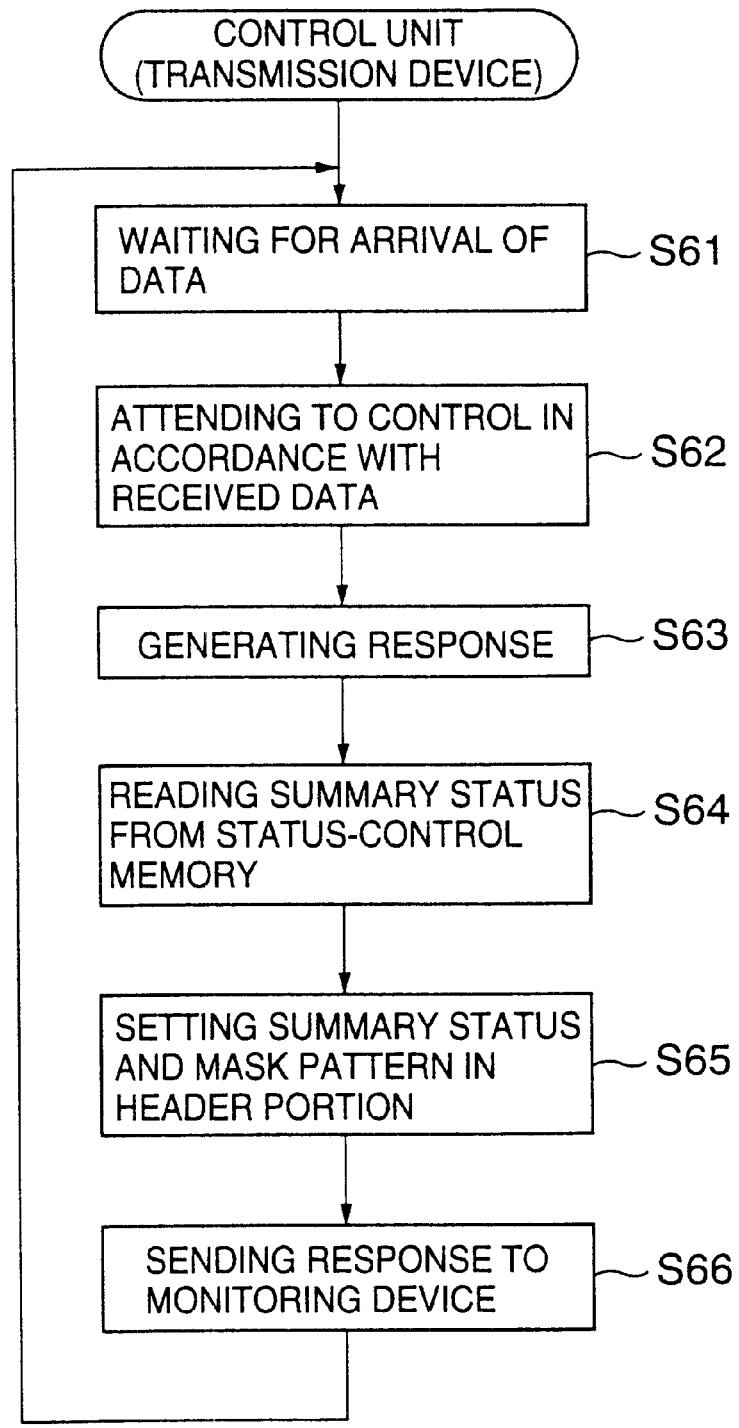
FIG. 22 is a flowchart of a procedure performed by a control unit of the transmission device.

FIG. 22 is a flowchart of a procedure performed by the control unit 12 of the transmission device.

The control unit 12 waits for data to be sent from the monitoring device (step S61). The data to be received may be one of various control commands including a polling command. Upon receiving a control command, the control unit 12 performs a control operation in accordance with the control command by instructing the package-control units 16, for example (step S62), and generate a response, which is then included in a communication frame (step S63). Further, the summary status is read from the status-control memory 15 (step S64). The summary status is set to the summary status ST of the communication-frame header portion, and an appropriate ON/OFF-bit pattern is set to the mask pattern MS (step S65). The communication frame is then sent to the monitoring device as a response (step S66).

Figure 23:
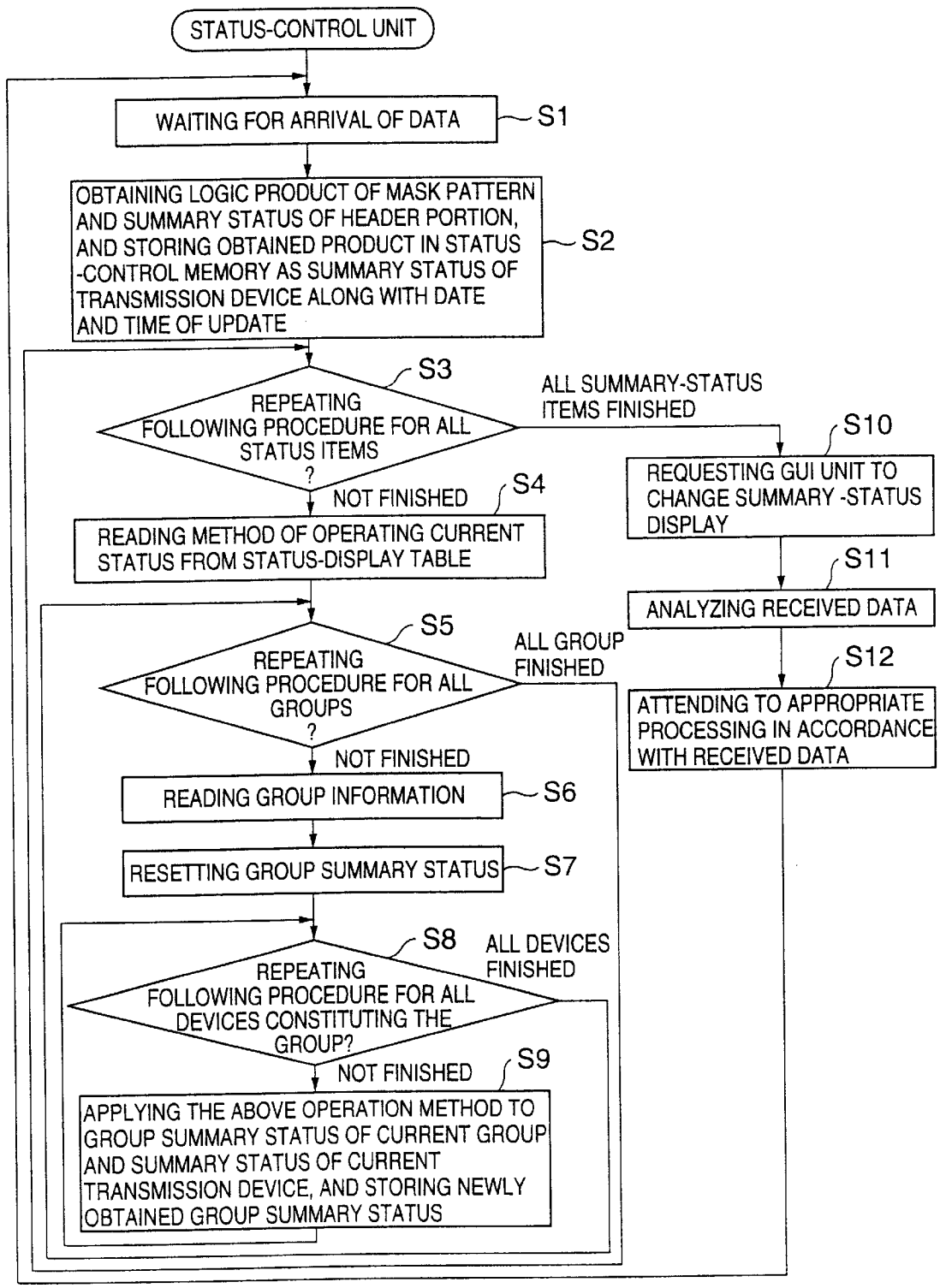
FIG. 23 is a flowchart of a procedure performed by a status-control unit of the monitoring device according to the embodiment.

FIG. 23 is a flowchart of a procedure performed by the status-control unit 3 of the monitoring device according to the embodiment.

As shown in the figure, when a communication frame is received from a transmission device, the mask pattern MS and the summary status ST of the header portion of the communication frame are subjected to a logic product operation, and the obtained product is stored in the status-control memory 5 as a summary status of the transmission device. Also, a date and time of update is recorded along with the summary status (step S2). In this example, for the sake of simplicity, a simple logic sum is obtained between the mask pattern MS and the summary status ST. Alternatively, of course, a status item corresponding to a OFF bit of the mask pattern may be treated as an invalid status.

After this, the following procedure is repeated as many times as there are status items (i.e., the following procedure is performed for all the status items) (step S3). In this example, the number of the status items is 8. This is because the summary status ST of the communication-frame header portion shown in FIG. 20C is comprised of 8 bits. Here, the reserved bits are also included in the total number.

An operation method that defines the way of displaying a current status is read from the status-display table 6 (step S4). Here, the operation method may be a method of summarizing statuses with respect to devices of a given group.

After this, the following procedure will be performed with respect to all the groups registered in the status-control memory 5 (step S5). First, a current group among all the groups registered in the status-control memory 5 is taken into consideration so as to read its group information (i.e., a group summary status and IDs of devices constituting the group) (step S6). The contents of the group summary status are reset (step S7). Thereafter, the following procedure will be repeated with respect to all the devices constituting the group (step S8). Namely, the operation method previously read from the status-display table 6 is performed on the group summary status of the current group and the summary status of the current transmission device, both of which are stored in the status-control memory 5, and the newly obtained group summary status is stored in the status-control memory 5 (step S9). In this manner, the current status item is read from the status-control memory 5 with respect to each of all the devices of the current group, and the group summary status is obtained for the current group by using the operation method extracted from the status-display table 6.

If the operation of all the current status items is completed (step S3), a request is made to the GUI unit 8 so as to change the summary-status display (step S10). Data included in the received communication frame is analyzed (step S11), and appropriate processing is performed in accordance with the contents of the received data (step S12).

The GUI unit 8 which has received the request for changing the summary-status display attends to the following processing.

Figure 24:
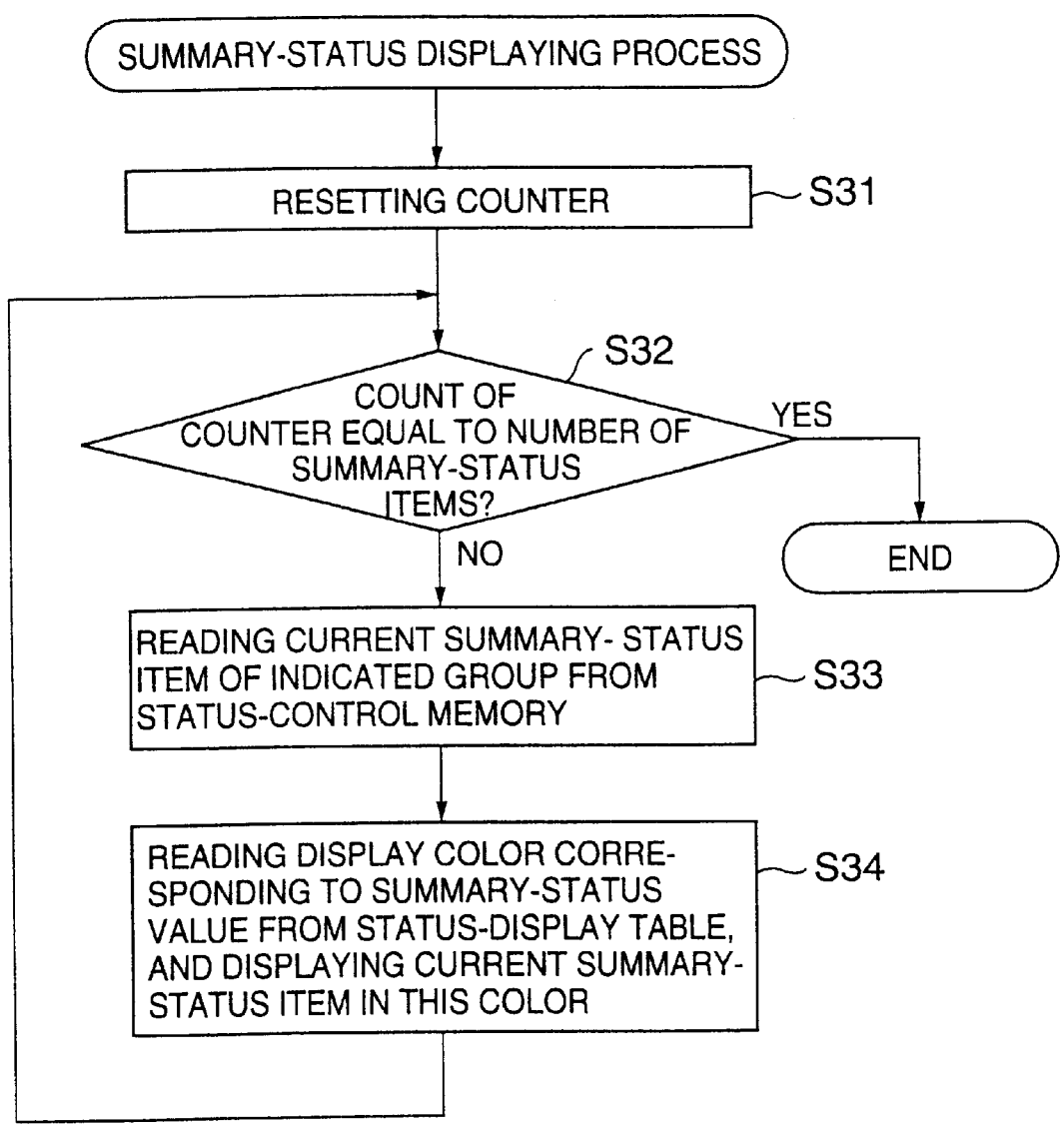
FIG. 24 is a flowchart of a procedure which is performed by a GUI unit when displaying a group summary status.

FIG. 24 is a flowchart of a procedure which is performed by the GUI unit 8 when displaying a group summary status.

A counter for indicating a summary-status item (8 items in total according to this example) is reset (step S31). A check is made as to whether the counter has indicated all the summary-status items (step S32). If it has not, the current summary-status item of an indicated group is read from the status-control memory 5 (step S33). A display color corresponding to the summary-status value that has just been read is read from the status-display table 6, and the current summary-status item on the display screen showing the group summary status is changed to this display color (step S34). The counter is incremented by one before going back to the step S32, and the same procedure is repeated until all the summary-status items are dealt with. The screen for displaying a group summary status will be described later in detail.

Figure 25:
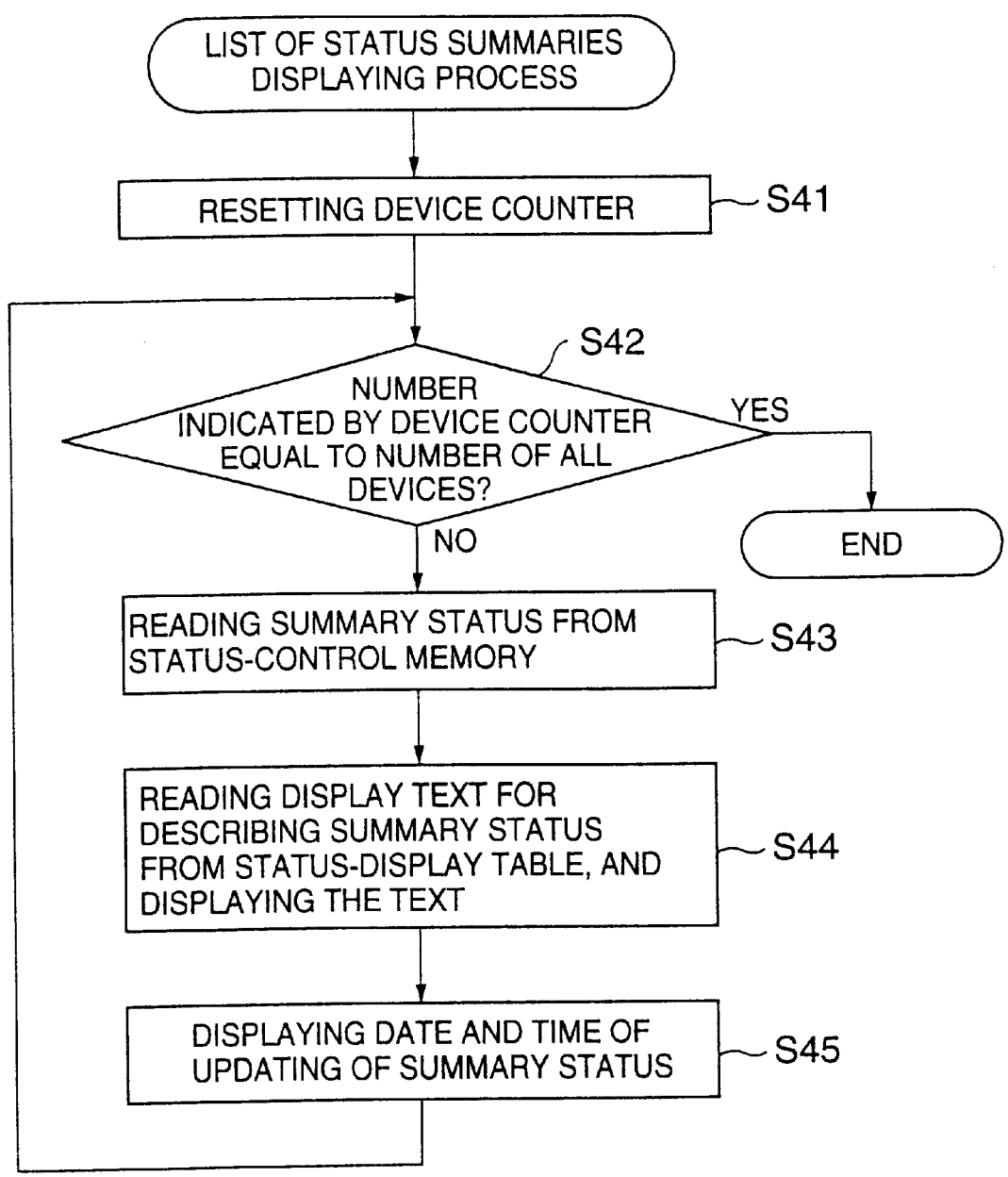
FIG. 25 is a flowchart of a procedure which is performed by the GUI unit when displaying a list of summary statuses.

FIG. 25 is a flowchart of a procedure which is performed by the GUI unit 8 when displaying a list of summary statuses.

Since an identical procedure is going to be repeated as many times as there are devices, a counter for indicating an identification number (ID) of a device is reset at the beginning (step S41). A check is made as to whether a number indicated by this counter is equal to the number of all the devices (step S42). If it is not, a summary status is read from the status-control memory 5 with respect to the current transmission device (i.e., the transmission device indicated by the counter) (step S43). A display text for describing this summary status is read from the status-display table 6, and the summary status displayed on the screen of the list of summary statuses is changed accordingly (step S44). Further, the date and time of update of the summary status regarding the current transmission device is displayed on the list of summary statuses. The screen for displaying the list of summary statuses will be described later in detail.

In what follows, an operations of the monitoring device associated with issuing of a control command (e.g., a polling command) will be described.

As previously described, the control unit 12 of the transmission device performs a control operation when the transmission device receives a control command. When returning a response, a summary status is read from the status-control memory 15, and is set to a communication-frame header portion along with a mask pattern as the communication frame is used for returning the response to the monitoring device. The monitoring device then attends to processing similar to that performed for an alarm report, thereby updating and displaying the summary status.

Figure 26:
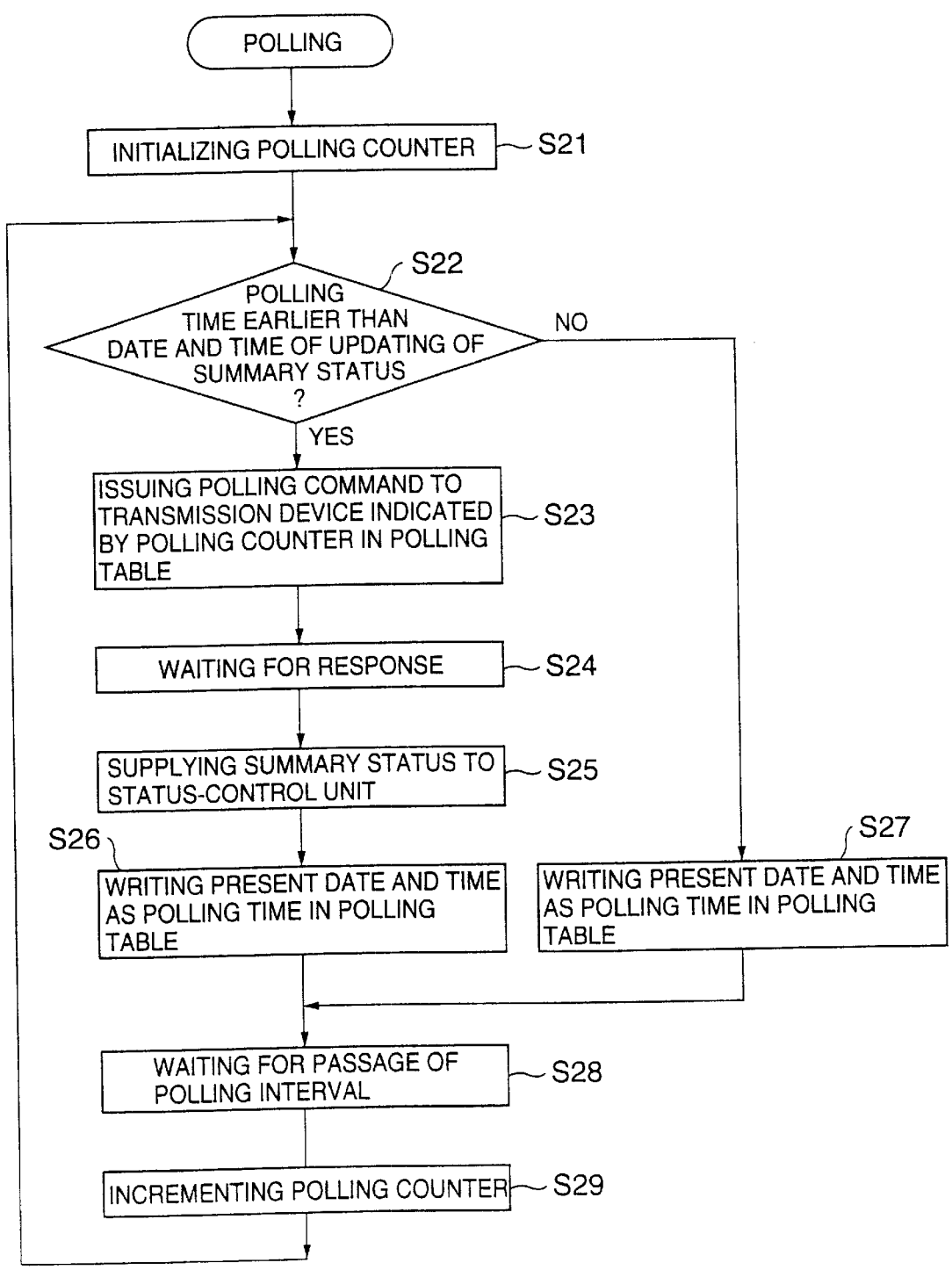
FIG. 26 is a flowchart of a detailed procedure performed by a polling unit of the monitoring device.

FIG. 26 is a flowchart of a detailed procedure performed by the polling unit 4 of the monitoring device.

After activation, the polling unit 4 initializes a polling counter. The polling counter is used for indicating an identification number of a transmission device which is subjected to polling.

With respect to a transmission device indicated by the polling counter, a polling time indicative of a time at which the polling is performed is read from the polling table 7, and a date and time of updating of the summary status is read from the status-control memory 5. The polling time is then compared with the date and time of updating of the summary status (step S22).

If the polling time is earlier than the date and time of updating of the summary status, i.e., when the summary status has been updated based on information included in a communication-frame header not responding to a polling command after the summary status was collected via the latest polling command, a next polling operation scheduled according to the proscribed polling intervals is postponed so as to skip an unnecessary polling operation. This action is taken because the latest updating of the summary status was conducted less than the proscribed polling interval prior to the next scheduled polling operation, and, thus, there is no need to update the summary status again within a time period shorter than the polling interval. To this end, a date and time of the present moment is written in the polling table 7 as a polling time of the transmission device (step S27).

If the polling time is no earlier than the date and time of updating of the summary status, i.e., when the latest polling operation is no earlier than the latest updating of the summary status, it is ascertained that no change in the summary status has taken place since the latest polling operation. In this case, the following operation is performed. A polling command is issued to a transmission device indicated by the polling counter (step S23), and no action is taken until a response to the polling is received from the transmission device (step S24). Upon receipt of the polling response, the summary status and the mask pattern are extracted from the header portion, and are supplied to the status-control unit 3 (step S25). This results in the summary status being updated and displayed accordingly. Further, a date and time of the present moment is written in the polling table 7 as a polling time of the transmission device (step S26). That is, the polling time is updated so as to indicate the time at which the latest polling is conducted.

Then, the polling unit 4 waits for a passage of the polling interval (step S28). Upon passage of the polling interval, the polling counter is incremented by one (step S29), and the procedure goes back to the step S22.

In what follows, a more detailed description will be given with regard to the operations of the present embodiment.

Figure 27:
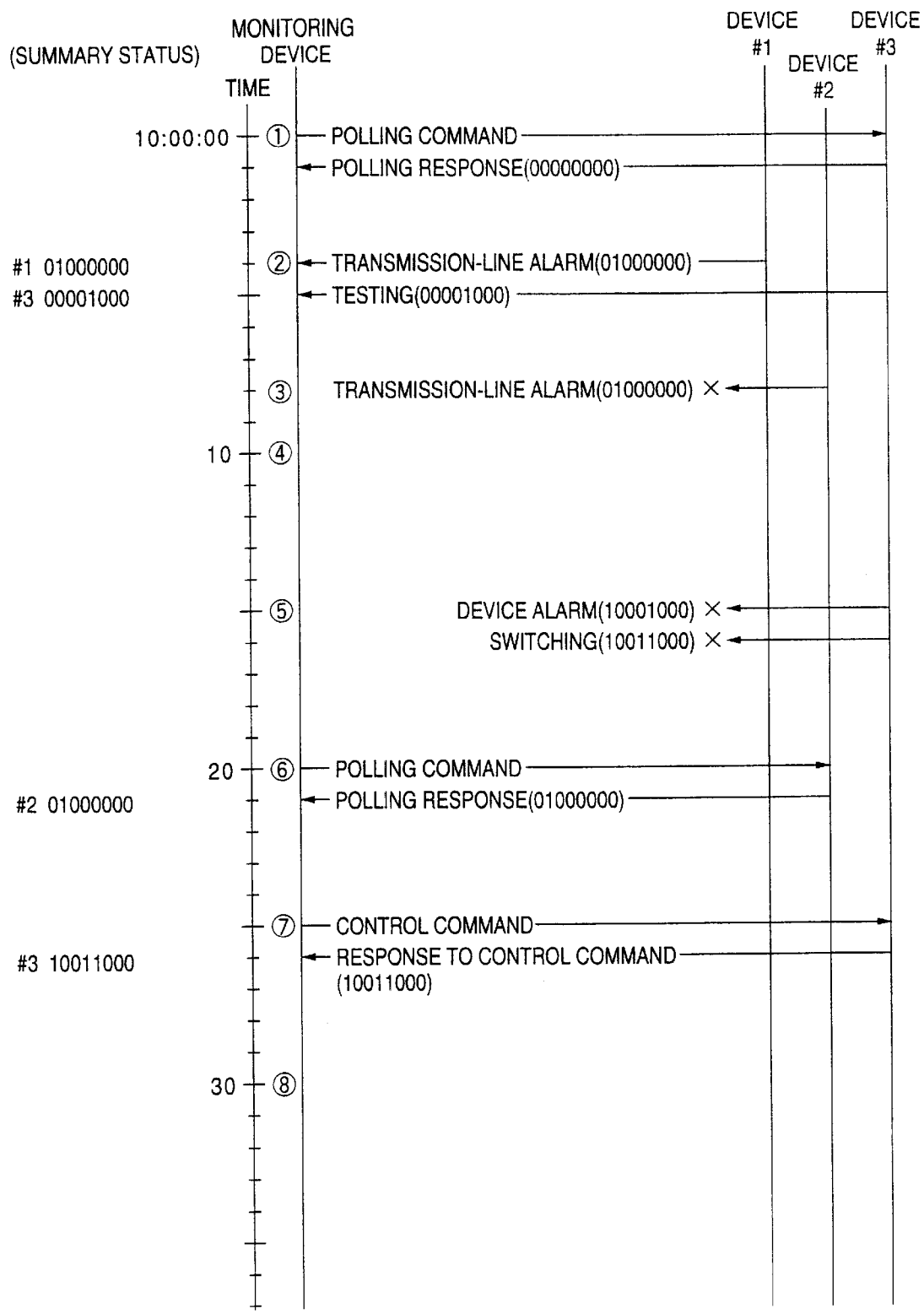
FIG. 27 is a sequence chart for explaining operations of the present embodiment.

FIG. 27 is a sequence chart for explaining the operations of the present embodiment.

In this example, three transmission devices are provided as devices subjected to monitoring. At an initial state, all the three transmission devices are operating normally. In the figure, 8 digits in parenthesis following information sent from the transmission device represent 8 bits of a summary status included in a communication-frame header. In this example, a polling interval is set to 10 seconds. The mask pattern is (11110000) (i.e., testing and reserved bits are invalid) with respect to a device #1, and (11111000) (i.e., reserved bits alone are invalid) with respect to devices #2 and #3.

EVENT 1: The monitoring device performs a polling operation with respect to the transmission device #3 by issuing a polling command. Since the transmission device #3 is operating normally, a summary status included in a polling response is all zeros. This is shown in the figure as a polling response (00000000).

FIGS. 28A and 28B are illustrative drawings showing the contents of tables at this moment.

The monitoring device having received the polling response obtains a logic product of the received summary status (00000000) and the mask pattern (11111000), and stores the result (00000000) as the summary status of the transmission device #3 in the status-control memory 5 along with a date and time of the present moment. Here, this date and time indicates when the summary status is updated, and is 1998/01/01 10:00:01 in this example as shown in FIG. 28A. At this point of time, a summary status of a group #1 is (00000000) since the group summary status is defined as a logic sum of all the summary statuses as proscribed in the status-display table 6 of FIG. 18.

The polling unit 4 stores the time of the receipt of the polling command in the polling table 7 as a polling time. Here, the time of the receipt of the polling command is comprised of a year, a month, a day, and a time in the same manner as the date and time of updating of the summary status.

FIGS. 29A and 29B are illustrative drawings showing examples of a displayed group summary status and a displayed list of summary statuses, which are displayed under control of the GUI unit 8.

When displaying a summary status of the group #1, the GUI unit 8 obtains each item value of the summary status, and, also, obtains a corresponding display color from the status-display table 6, thereby determining what color is to be used at a given display field. As shown in FIG. 29A, the device alarm has a summary value of zero (indicating a normal condition), for example, and, thus, is displayed by using a green color (0, 255, 0) as defined in the status-display table 6.

Further, when displaying the list of summary statuses, the GUI unit 8 determines based on the status-display table 6 what text is to be displayed with respect to a given status value of a given transmission device. As shown in FIG. 29B, the device alarm of the transmission device #1 has a summary value of zero, for example, and, thus, a text "normal" is displayed in accordance with what is defined in the status-display table 6.

EVENT 2: The transmission device #1 suffers a transmission-line alarm, so that the transmission device #1 sends a report to the monitoring device for the purpose of reporting the generation of the transmission-line alarm. One second after the generation of the transmission-line alarm, the transmission device #3 starts a test, so that the transmission device #3 sends to the monitoring device a report regarding a start of the test. A communication frame carrying a respective report has a header portion thereof provided with the summary status of a respective transmission device. The status-control unit 3 of the monitoring device, acting in the same manner as in the case of EVENT 1, stores the following data in the status-control memory 5.

[Transmission Device #1]
| | |
|---|---|
| Reported Summary Status ST | 01000000 |
| Mask Pattern MS | 11110000 |
| ST & MS Stored in Status-Control Memory = | 01000000 |
| (1998/01/01 10:00:04) | |

[Transmission Device #3]
| | |
|---|---|
| Reported Summary Status ST | 00001000 |
| Mask Pattern MS | 11111000 |
| ST & MS Stored in Status-Control Memory = | 00001000 |
| (1998/01/01 10:00:05) | |

[Group #1]
| | |
|---|---|
| Summary Status Stored in Status-Control Memory = | 01001000 |

FIGS. 30A and 30B are illustrative drawings showing the contents of the tables at this moment. FIGS. 31A and 31B are illustrative drawings showing the displayed group summary status and the displayed list of summary statuses at this moment.

EVENT 3: A transmission-line alarm is generated in the transmission device #2, and the transmission device #2 sends a report to the monitoring device for the purpose of reporting the transmission-line alarm. For some unexpected reason, however, the report does not reach the monitoring device. Because of this accident, there is no way for the monitoring device to learn about the change in the summary status which took place in the transmission device #2. The monitoring device thus keeps the same old summary status (00000000).

EVENT 4: The polling schedule according to the polling table indicates that the next polling operation is to be conducted for the transmission device #1. However, since the time of the latest polling (1998/01/01 09:59:41) is earlier than the time of updating of the status-control memory (1998/01/01 10:00:04) (see FIGS. 30A and 30B), the polling operation for the transmission device #1 is skipped.

The polling time is updated to the date and time of the present moment as preparation for a next polling operation.

FIGS. 32A and 32B are illustrative drawings showing the contents of the tables at this moment (EVENT 4). FIGS. 33A and 33B are illustrative drawings showing the displayed group summary status and the displayed list of summary statuses at this moment.

EVENT 5: The transmission device #3 suffers generation of a device alarm and switching in addition to the start of the test which took place at EVENT 2, and makes an attempt to report these to the monitoring device. For some unexpected reason, however, the report does not reach the monitoring device. The summary status in the possession of the transmission device #3 is (10011000), but the summary status stored in the monitoring device remains (00001000).

EVENT 6: It becomes the time to perform a polling operation with respect to the transmission device #2 according to the polling table 7. Since the status-control memory 5 and the polling table 7 are the same as those of FIGS. 32A and 32B, respectively, the time of updating of the summary status (1998/01/01 09:59:51) is no later than the polling time (1998/01/01 09:59:51). Accordingly, the polling operation is conducted as scheduled with respect to the transmission device #2.

The status-control unit 3 of the monitoring device stores the summary status of the transmission device #2 as follows in response to a polling response sent from the transmission device #2. Here, the polling time is the same as the time of updating of the summary status.

| [Transmission Device #2] | |
| --- | --- |
| Reported Summary Status ST | 01000000 |
| Mask Pattern MS | 11111000 |
| ST & MS Stored in Status-Control Memory = (1998/01/01 10:00:21) | 01000000 |
| [Group #1] | |
| Summary Status Stored in Status-Control Memory = 10011000 | |

FIGS. 34A and 34B are illustrative drawings showing the contents of the tables at this moment (EVENT 5). FIGS. 35A and 35B are illustrative drawings showing the displayed group summary status and the displayed list of summary statuses at this moment.

EVENT 7: The monitoring device issues a control command to the transmission device #3. A response returned from the transmission device #3 includes a summary status of the transmission device #3 in a header portion of the communication frame, so that the monitoring device can detect a change in the summary status of the transmission device #3. Namely, the following data is stored in the status-control memory.

| [Transmission Device #3] | |
| --- | --- |
| Reported Summary Status ST | 10011000 |
| Mask Pattern MS | 11111000 |
| ST & MS Stored in Status-Control Memory = (1998/01/01 10:00:26) | 10011000 |
| [Group #1] | |
| Summary Status Stored in Status-Control Memory = 11011000 | |

FIGS. 36A and 36B are illustrative drawings showing the contents of the tables at this moment (EVENT 7). FIGS. 37A and 37B are illustrative drawings showing the displayed group summary status and the displayed list of summary statuses at this moment.

EVENT 8: It is the time to conduct a polling operation with respect to the transmission device #3. As in the case of EVENT 4, the time of the latest polling (1998/01/01 10:00:01) is earlier than the time of updating of the summary status (1998/01/01 10:00:26) (see FIGS. 36A and 36B), the polling operation for the transmission device #3 is skipped.

The polling time is updated, however, to reflect the date and time of the present moment.

FIGS. 38A and 38B are illustrative drawings showing the contents of the tables at this moment (EVENT 8). FIGS. 39A and 39B are illustrative drawings showing the displayed group summary status and the displayed list of summary statuses at this moment.

FIG. 40 is an illustrative drawing showing the status-display table 6 in a case where a device for controlling a status of alarm suppression as one of the summary status items is added according to another embodiment of the present invention.

In this example, a text for indicating presence of a test is changed from the text "present" used in the previous embodiment to "testing underway".

FIGS. 41A and 41B are illustrative drawings showing the contents of the tables in the case where a device #4 having an alarm-suppression status is added as in the example of FIG. 40. FIGS. 42A and 42B are illustrative drawings showing examples of screen display.

The device #4 has a mask pattern which is 11111100. When the status-control memory 5 and the polling table 7 have the contents thereof as shown in FIGS. 41A and 41B, respectively, a group-summary status and a list of summary statuses are displayed as shown in FIGS. 42A and 42B, respectively. Since the text information and display colors for displaying summary status items are defined in the status-display table 6, it is possible to display the items as shown in FIGS. 42A and 42B without making a change to a program.

Further, the present invention is not limited to these embodiments, but various variations and modifications may be made without departing from the scope of the present invention.

The present application is based on Japanese priority application No. 10-183781 filed on Jun. 30, 1998, with Japanese Patent Office, the entire contents of which are hereby incorporated by reference.

What is claimed is:

1. A network monitoring system comprising:
   a network:
   a monitoring device connected to said network; and
   a plurality of monitored devices connected to said network, each of said monitored devices having various statuses thereof summarized as a summary status, and sending the summary status to said monitoring device when sending a response in reply to a summary-status collecting command issued from said monitoring device as well as when sending other information that is not said response,
   wherein said monitoring device controls the summary status of a given one of the monitored devices based on the summary status received from the given one of the monitored devices.

2. The network monitoring system as claimed in claim 1, wherein each of said monitored devices sends the summary status to said monitoring device by inserting the summary status into a predetermined area provided in a header portion of a communication frame directed to said monitoring device.

3. The network monitoring system as claimed in claim 1, wherein each of said monitored devices sends to said monitoring device valid/invalid information indicating which item of the summary status is valid, and the monitored device controls one or more items of the summary status with respect to a given one of the monitored devices only if the one or more items are valid with respect to the given one of the monitored devices.

4. The network monitoring system as claimed in claim 1, wherein said monitoring device includes a status-display table which defines how to summarize summary statuses with respect to a given group of the monitored devices, and obtains the summary status of the given group of the monitored devices in accordance with what is defined in said status-display table.

5. The network monitoring system as claimed in claim 1, wherein said monitoring device includes a status-display table which defines how to display each item of the summary status, and displays each item of the summary status in accordance with what is defined in said status-display table.

6. The network monitoring system as claimed in claim 1, wherein said monitoring device keeps record of a time of a latest updating of the summary status with respect to each of said monitored devices, and displays the time along with the summary status.

7. The network monitoring system as claimed in claim 1, wherein said monitoring device issues the summary-status collecting command in a polling operation performed at constant intervals, and skips a given polling operation scheduled for a given one of the monitored devices when the summary status is updated during a latest one of the constant intervals based on said other information sent from the given one of the monitored devices.

8. A monitoring device connected to monitored devices via a network, comprising:

a status-control unit which obtains a summary status from what is received from a given one of the monitored devices when the given one of the monitored devices sends the summary status by sending a response in reply to a summary-status collecting command issued from said monitoring device as well as when the given one of the monitored devices sends the summary status by sending other information that is not said response; and a status-control memory which stores the summary status of the given one of the monitored devices.

9. The monitoring device as claimed in claim 8, wherein said status-control unit obtains the summary status from a predetermined area of a header portion of a communication frame which is sent from the given one of the monitored device.

10. The monitoring device as claimed in claim 8, wherein said status-control unit obtains from the given one of the monitored devices valid/invalid information indicating which item of the summary status is valid, and controls one or more items of the summary status with respect to the given one of the monitored devices only if the one or more items are valid with respect to the given one of the monitored devices.

11. The monitoring device as claimed in claim 8, further comprising a status-display table which defines how to summarize summary statuses with respect to a given group of the monitored devices, wherein said status-control unit obtains the summary status of the given group of the monitored devices in accordance with what is defined in said status-display table.

12. The monitoring device as claimed in claim 8, further comprising:

a status-display table which defines how to display each item of the summary status; and a graphics-user-interface unit which displays each item of the summary status in accordance with what is defined in said status-display table.

13. The monitoring device as claimed in claim 8, wherein said status-control unit keeps record of a time of a latest updating of the summary status with respect to each of said monitored devices.

14. The monitoring device as claimed in claim 8, further comprising a polling unit which issues the summary-status collecting command in a polling operation performed at constant intervals, and skips a next polling operation for a next scheduled one of the monitored devices when the summary status is updated during a latest one of the constant intervals based on said other information sent from the next scheduled one of the monitored devices.

15. A monitored device connected to a monitoring device via a network, said device comprising:

a status-control unit which generates and keeps a summary status by summarizing various statuses of said monitored device, and sends the summary status to the monitoring device when sending a response in replay to a summary-status collecting command issued from the monitoring device as well as when sending other information that is not a response responding to the summary-status collecting command issued by the monitoring device.

16. The monitoring device as claimed in claim 15, wherein said status-control unit sends the summary status to the monitoring device by inserting the summary status into a predetermined area provided in a header portion of a communication frame directed to said monitoring device.

17. The monitoring device as claimed in claim 15, wherein said status-control unit sends to said monitoring device valid/invalid information indicating which item of the summary status is valid.

* * * * *